United States Patent [19]
Scozzarella et al.

[11] Patent Number: 6,049,697
[45] Date of Patent: Apr. 11, 2000

[54] TRANSLATOR FOR MESSAGES TRANSMITTED TO AND RECEIVED BY A NUMERIC PAGER

[76] Inventors: Arlene Scozzarella, 4 Marina Dr. N-4, Mahopac, N.Y. 10541; Frank Ciociola, 30 Huntsbridge Rd., Yonkers, N.Y. 10704

[21] Appl. No.: 09/099,794

[22] Filed: Jun. 18, 1998

[51] Int. Cl.[7] .............................. H04B 7/14; G08B 5/22; H03K 17/94
[52] U.S. Cl. ...................... 455/31.2; 455/31.1; 455/38.4; 455/556; 455/566; 455/412; 455/186.2; 340/825.44; 379/93.27; 341/20; 341/22
[58] Field of Search ................................... 455/38.1, 38.4, 455/38.5, 31.1, 31.2, 31.3, 412, 466, 566, 556, 186.1, 186.2, 575; 340/311.1, 825.44; 379/93.18, 93.27, 52; 341/20, 22; 364/709.11, 709.12

[56] References Cited

U.S. PATENT DOCUMENTS

| | | | |
|---|---|---|---|
| Re. 32,365 | 3/1987 | Sebestyen | 340/311.1 |
| 3,925,779 | 12/1975 | Gerstenhaber | 340/337 |
| 3,976,840 | 8/1976 | Cleveland | 179/2 DP |
| 4,229,817 | 10/1980 | Morgan | 375/2 |
| 4,293,855 | 10/1981 | Perkins | 340/712 |
| 4,304,968 | 12/1981 | Klausner | 179/6.02 |
| 4,349,695 | 9/1982 | Morgan | 178/22.08 |
| 4,406,998 | 9/1983 | Willough | 340/815.01 |
| 4,427,848 | 1/1984 | Tsakanikas | 379/93.27 |
| 4,563,758 | 1/1986 | Paternostro | 367/132 |
| 5,249,220 | 9/1993 | Moskowitz et al. | 379/93.19 |
| 5,257,307 | 10/1993 | Masahiro | 379/57 |
| 5,390,362 | 2/1995 | Modjeska | 455/38.1 |
| 5,424,725 | 6/1995 | Wandt | 340/825.44 |
| 5,481,255 | 1/1996 | Albert et al. | 455/38.1 |
| 5,528,770 | 6/1996 | Castilla | 455/351 |
| 5,535,434 | 7/1996 | Siddoway | 455/89 |
| 5,561,702 | 10/1996 | Lipp | 379/57 |
| 5,561,710 | 10/1996 | Helms | 379/93.18 |
| 5,581,593 | 12/1996 | Engelke et al. | 455/31.2 |
| 5,600,312 | 2/1997 | Willard | 340/825.47 |
| 5,719,936 | 2/1998 | Hillenmayer | 455/575 |
| 5,809,425 | 9/1998 | Colwell et al. | 455/31.2 |
| 5,920,826 | 7/1999 | Metso et al. | 455/466 |
| 5,929,774 | 7/1999 | Charlton | 455/556 |

Primary Examiner—Reinhard J. Eisenzopf
Assistant Examiner—Eliseo Ramos-Feliciano
Attorney, Agent, or Firm—Lackenbach Siegal

[57] ABSTRACT

A computer-based hand-held translator device for use in relation to preparing a numeric message for sending from a telephone having a telephone keypad to a numeric pager and also in relation to displaying an alpha message originally received as a numeric message on a numeric pager. Keystroke entry of alpha and numeric keys create alpha mode and numeric mode messages on a display. Entry of a translator actuator on the keyboard accesses a chip that translates an alpha mode message on the display to a numeric mode message on the display and that translates a numeric mode message on the display to an alpha mode message in accordance with an algorithm loaded into the chip. At the sender side the alpha message on the display is translated into a numeric mode that is entered onto a telephone keypad targeted to a pager. At the receiver side, the numeric message is entered onto the translator device and then translated to an alpha message. A personal notebook system is optionally included in the translator device.

44 Claims, 15 Drawing Sheets

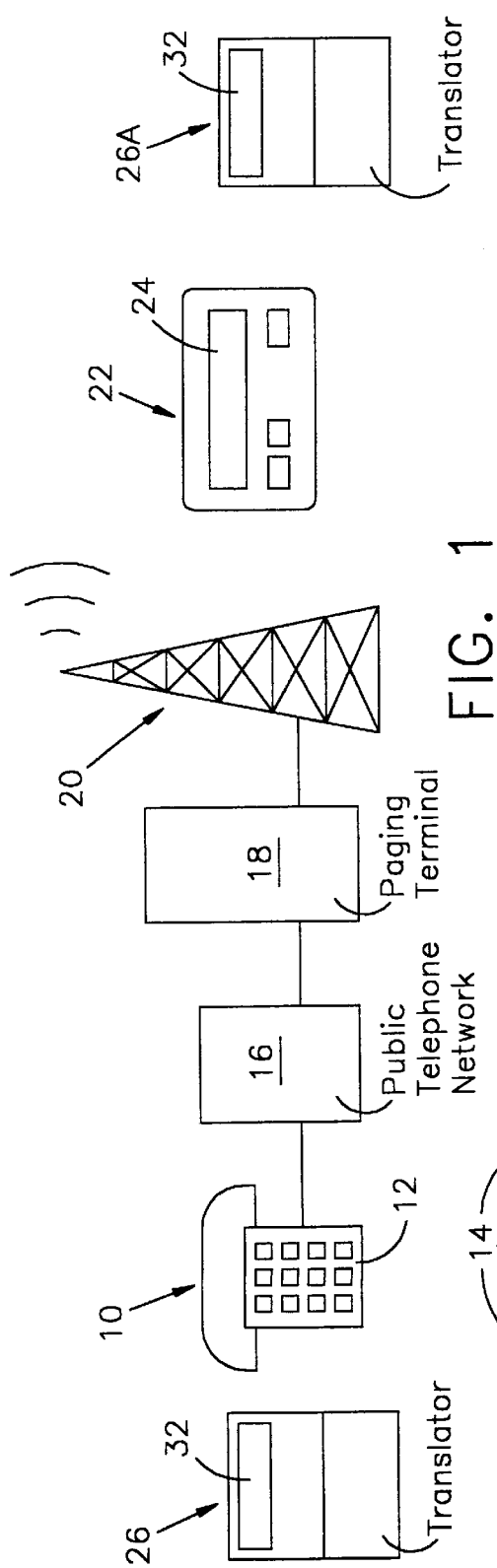
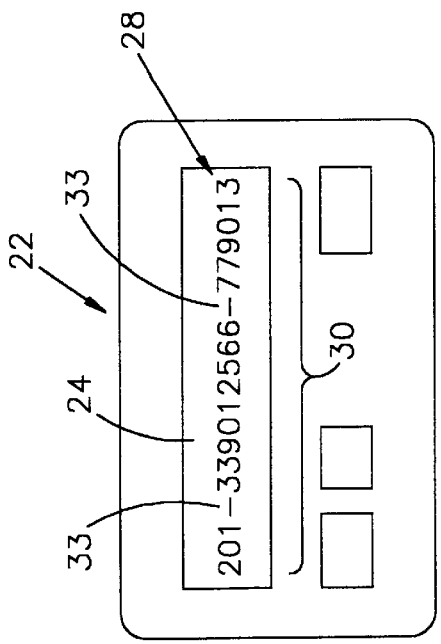
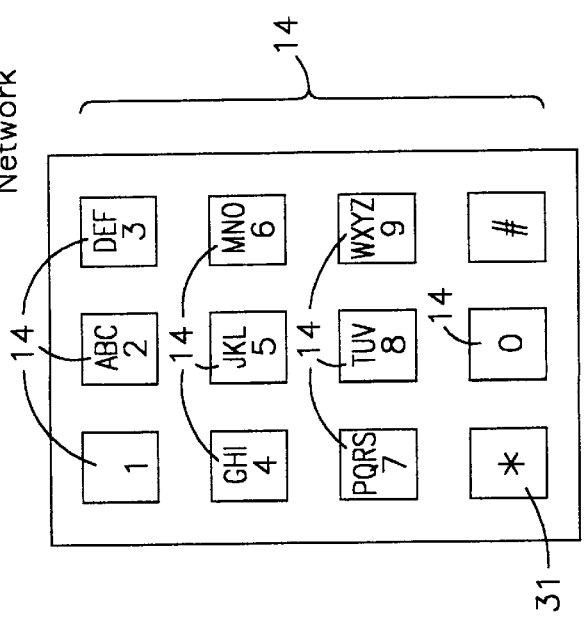

TRANSLATOR FOR MESSAGES TRANSMITTED TO AND RECEIVED BY A NUMERIC PAGER

FIELD OF THE INVENTION

This invention relates to the field of radio pagers and particularly to a device for enabling transmission or reception of alpha or alphanumeric messages being sent to or received at a numeric pager.

BACKGROUND OF THE INVENTION

A numeric pager is one of the most common types of pagers in current use. A sender of a message to a numeric pager first places a telephone call by entering the pager identity on the keypad of a telephone for transmission to a paging terminal. The sender then enters numeric data information on the telephone keypad for transmittal to the paging terminal for further transmittal by the terminal to a radio transmitter for final transmission to the numeric pager. The numeric data is displayed on the pager display screen, usually a liquid crystal display (LCD). Many types of numeric pagers have the capability of presenting alphabetic characters or alphanumeric characters (alphabetic combined with numeric) processed from radio signals received by the pager that are directed to numeric codes linked to canned messages in memory that are in turn sent to the pager display for presentation as alpha character or alphanumeric character messages on a pager display screen. The common pager display screen usually has a capacity of twenty characters. Numeric pagers are inherently limited to the amount of information they convey by the very fact that numerals present only themselves, for example, a telephone number.

Many pagers can display canned alpha-numeric messages contained in the memory of the pager placed in pager memory at the factory. In a variation of such pager memory devices, it is also known that custom messages can be programmed by a user into a pager memory. In both cases, when a particular numeric code is entered at the telephone keypad by a sender, the canned alphanumeric message or the customized alphanumeric message is then displayed on the pager screen. Nonetheless, such canned and programmed alphanumeric messages are inherently inflexible in that non-canned and non-customized alphanumeric information cannot be presented on the pager screen.

In another type of pager communication, alphanumeric messages are presently being sent to pagers by "word message pagers" transmitted a live dispatch service, and by "word message entry devices", which have alpha keyboards and are connected to telephones. Typical of the word messenger pagers is Wordline of Motorola. Typical of word message entry devices are Quickword and Wordtrek of Motorola. The most recent alpha pager screens are large enough to present 240 characters per message.

With reference to FIG. 1, the standard operation of transmitting a numeric message to a numeric pager is as follows. A numeric message, commonly a telephone number to be called, is dispatched from a standard Dual Tone Multifrequency (DTMF) telephone 10. The sender of the numeric message first dials the pager number on a telephone keypad 12 by keystroke entry of twelve telephone keypad keys 14 including numeric keys 1, 2, 4, 5, 6, 7, 8, 9, 0 and the symbol keys of the asterisk (*) and pound (#) so as to access the public telephone network 16 and an automated paging terminal 18 connected to an antenna 20. The Personal Identification Number (PIN) of the particular pager to be reached is then entered on the telephone keypad along with the numeric message. A radio transmission from antenna 20 broadcasts the PIN, which activates a targeted numeric pager 22. The numeric message is then broadcast to numeric pager 22 where it appears on pager screen 24. Keystroke operation of the asterisk (*) on telephone keypad 12 results in the display of a dash (-) 33 on pager screen 24. For the purposes of telephone 10 to numeric pager 22 operation, the alphabetic indicia and the pound symbol (#) on telephone keypad 12 are ignored.

SUMMARY OF THE INVENTION

Accordingly, it is an object of the present invention to provide a computer-operated translator device that can be used to translate an alpha mode message to a numeric mode message and a numeric mode message to an alpha mode message in accordance with an algorithm for transmission of coded numeric messages that are based upon individually created, non-canned, alpha mode messages by telephone to a numeric pager so that a live dispatch service can be bypassed.

In accordance with this and other objects that will become apparent in the course of this disclosure, there is provided a computer-based hand-held translator device for use in relation to preparing a numeric message for sending from a telephone having a telephone keypad to a numeric pager and also in relation to displaying an alpha message originally received as a numeric message on a numeric pager. Keystroke entry of alpha and numeric keys create alpha mode and numeric mode messages on a display. Entry of a translator actuator on the keyboard accesses a translator module that translates an alpha mode message on the display to a numeric mode message on the display and that translates a numeric mode message on the display to an alpha mode message in accordance with an algorithm loaded into the module. At the sender side the alpha message on the display is translated into a numeric mode that is entered onto a telephone keypad targeted to a pager. At the receiver side, the numeric message is entered onto the translator device and then translated to an alpha message. A personal notebook system is optionally included in the translator device.

The present invention will be better understood and the objects and important features, other than those specifically set forth above, will become apparent when consideration is given to the following details and description, which when taken in conjunction with the annexed drawings, describes, discloses, illustrates and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

BRIEF DESCRIPTION OF THE DRAWINGS

FIG. 1 illustrates a translator device in accordance with the present invention shown with a standard telephone in communication with a conventional numeric pager by way of a public paging network and a radio antenna with another translator device at the numeric pager;

FIG. 1A is an enlarged view of the numeric pager shown in FIG. 1 showing the pager display screen;

FIG. 2 is a conventional keypad of a standard telephone;

FIG. 5A is an electrical block diagram of a combined alpha/numereric module connected with the translator electrical circuit;

DESCRIPTION OF THE PREFERRED EMBODIMENT

Reference is now made in detail to the drawings wherein the same numerals refer to the same or similar elements throughout.

Figure 3:
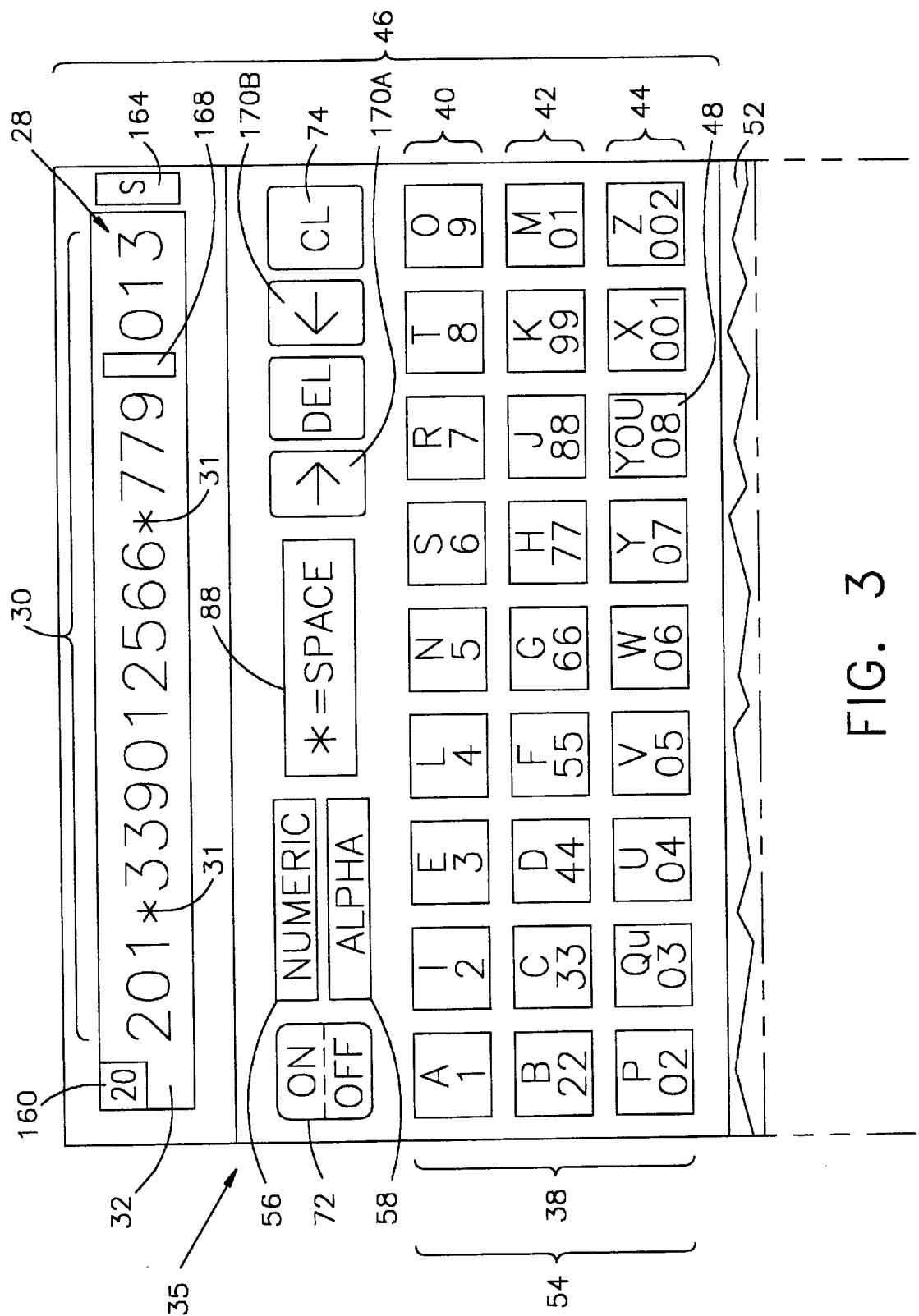
FIG. 3 is a detailed top view of the translator device in accordance with the present invention shown in FIG. 1 showing a numeric message on the display.
Figure 3:
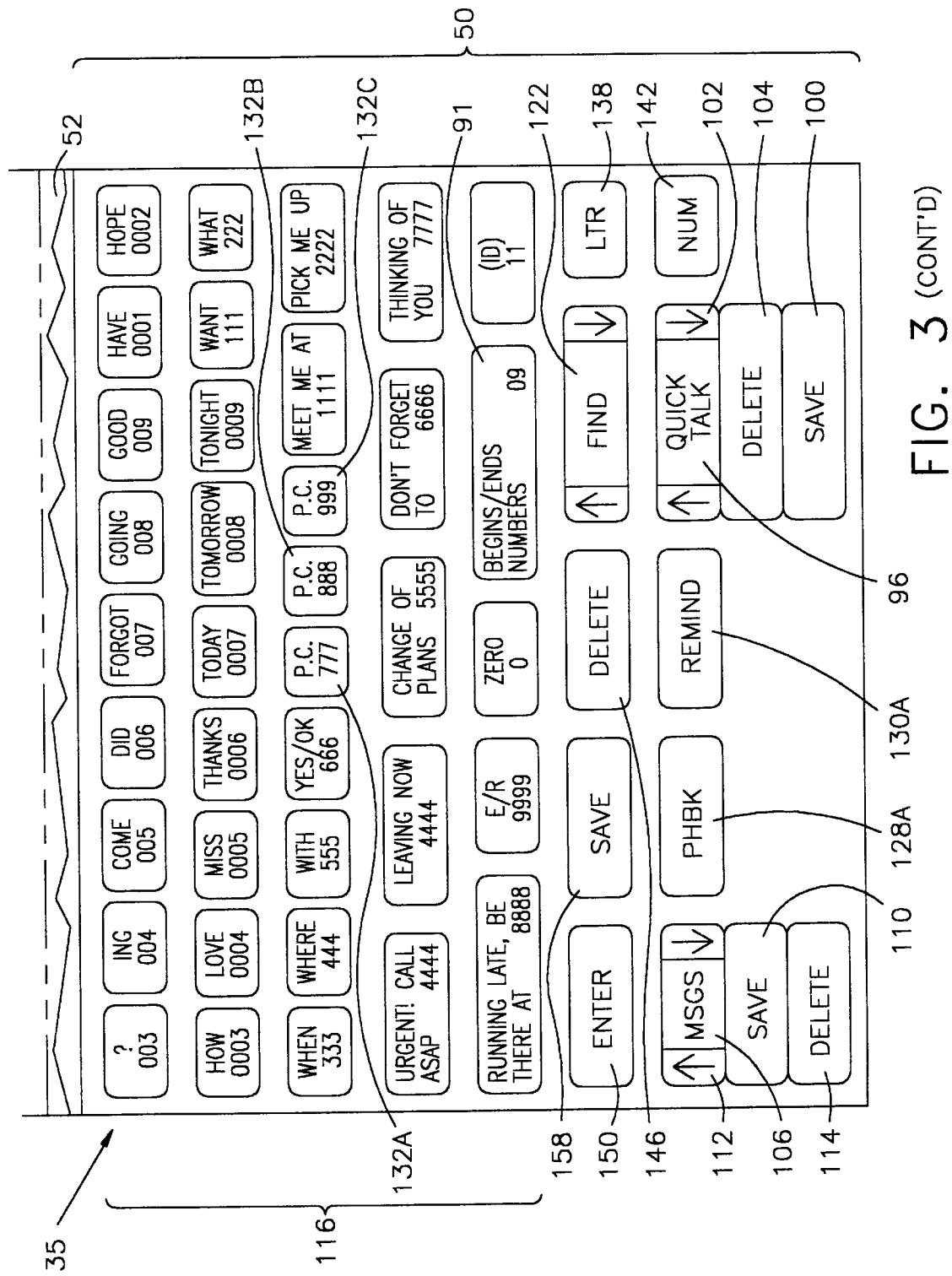

A translator device 26 located at the sender end by telephone 10 shown in FIGS. 1 and 3 is for use in relation to preparing a numeric message 28 for eventual display on targeted numeric pager 22 shown in FIGS. 1 and 1A. A second translator device 26A identical to translator device 26 is located at the receiver end where numeric pager 22 is located. For purposes of exposition, numeric message 28 includes numeric characters 30, 201*339012566*779013 and two asterisk symbols (*) 31 both on pager screen 24 in FIG. 1A and on translator display 32 of translator device 26 in FIG. 3. Numeric pager 22 has 20 spaces, or slots, each capable of receiving a numeric character. The expository numeric message 28 shown in FIGS. 1A and 3 has 18 numeric characters and 2 asterisk symbols (*) 31, which represent spaces between numeric characters so that all 20 slots of pager screen 24 have been utilized. Asterisk symbols (*) 31 on translator display 32 are transmitted as such to numeric pager 22 by keystroke operation of the asterisk symbol(*) 31 on telephone keypad 12 and appear as dashes (-) on pager screen 24. As shown in FIG. 3, translator display 32 likewise is provided with 20 slots thus duplicating the 20 slot capacity of pager screen 24.

The user sender transmits numeric message 28 displayed on translator display 32 to numeric pager 22 by copying the exact numeric message 28 as typified by the expository message shown on translator display 32, specifically the numeric characters 30 and asterisk symbols (*) 31 shown in FIG. 3, onto telephone keypad 12 by keystroke operation of telephone keypad numeric keys 14 including asterisk symbols (*) 31.

Figure 5:
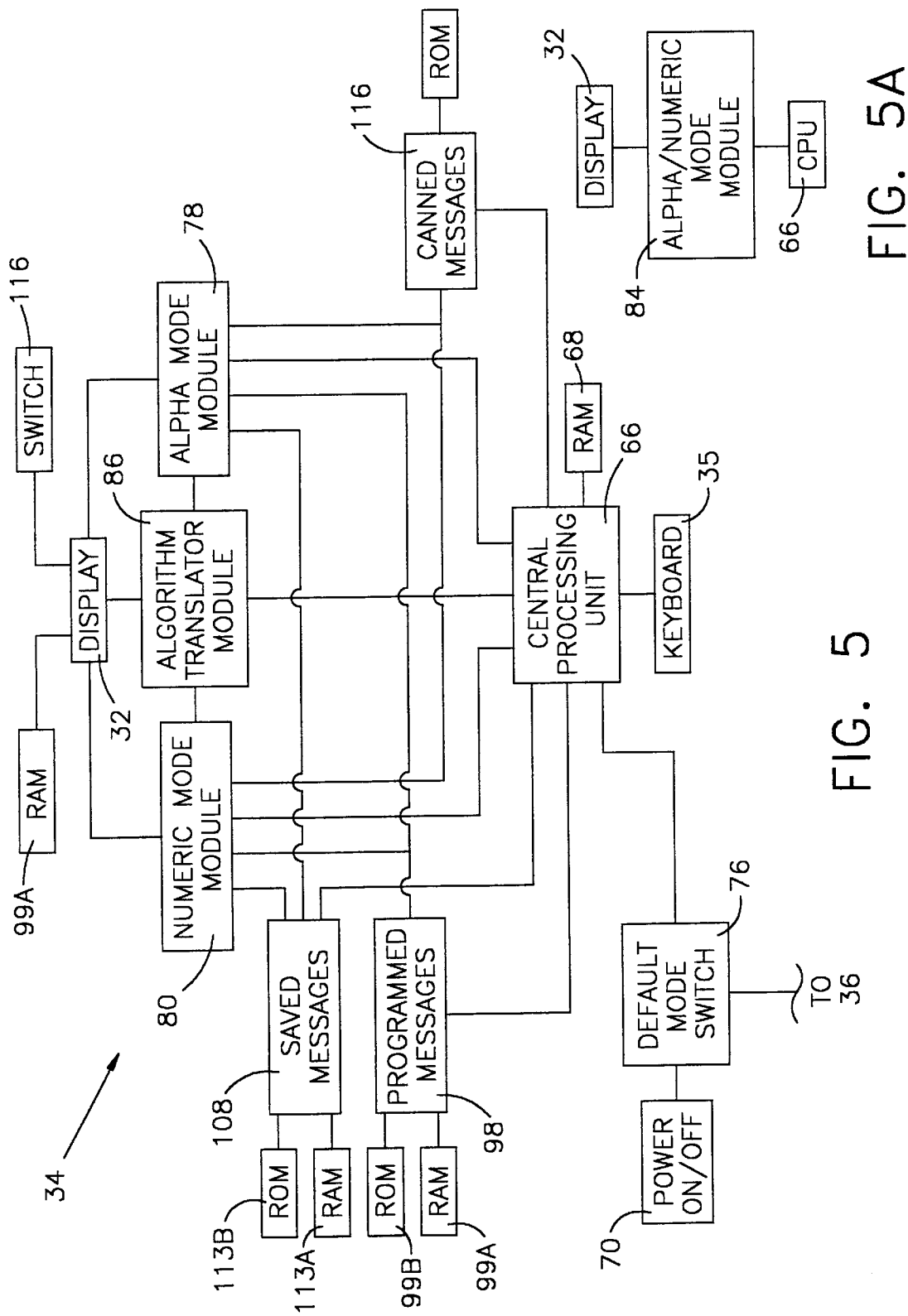
FIG. 5 is an electrical block diagram illustrating the translator mode of the translator device.

Translator device 26 includes a computer controlled key entry and translator electric circuit 34 including a keyboard 35 shown in an electronic block diagram in FIG. 5 that is used in preparation for transmitting numeric message 28. In addition, translator device 26 includes another computer controlled key entry and personal notebook electric circuit 36 including keyboard 35 shown in an electronic block diagram in FIG. 6.

The input system of translator device 26 particularly keyboard 35 includes a plurality of keys that includes twenty-six individual alpha letter keys, designated generally as alpha letter keys 38 in FIG. 3 which include the letters A through Z marked, or printed, as alphabetic indicia upon the face of each of alpha letter keys 38 representative of each of the letters of the alphabet, with the exception of the letter Q, which is represented by the designation Qu, which in the lexicon covers almost all words containing the letter Q. The designation Qu can optionally be designated directly as the letter Q rather than Qu. For the purposes of this specification, the letter Q and the designation Qu are considered interchangeable identities, that is, the designation Qu shown on one of the alpha letter keys 38 is the equivalent of the letter Q. Alpha letter keys 38 are generally arranged along three rows, namely, top row 40, middle row 42, and bottom row 44 in an upper portion 46 of translator device 26. The arrangement of the order of alpha letter keys 38 is out of the order of common sequence of the letters of the alphabet and likewise is not in accordance with the standard arrangement of placement of the letter keys of a computer but is in an order of sequence that experience has shown that for the particular usage of the present invention to be more efficient than either of the mentioned arrangements. Generally, the letter keys of top row 40 from left to right is A, I, E, L, N, S, R, T, and O. The letter keys of middle row 42 from left to right is B, C, D, F, G, H, J, K, M. The letter keys of bottom row 44 from left to right is P, Qu (or Q), U, V, W, Y, X, Z. In bottom row 44 among alpha letter keys 38 is a non-alpha key, or word key 48, marked with the indicia "YOU", which is placed in bottom row 44 between the alpha letters Y and X. Word key 48, YOU, is optionally located in bottom row 44 because of its common usage makes its shown location desirable so as to increase the efficiency of operation of the arrangement as a whole.

Translator device 26 also includes a lower portion 50 of equal area and configuration as upper portion 46 and that is joined to upper portion 46 along a fold line 52, so that translator device 26 can be closed along fold line 52 so that the faces of upper and lower portions 46 and 50 adjoin one another and the portability of translator device 26 is enhanced.

The input system of translator device 26 particularly keyboard 35 also includes twenty-six distinctive numeric keys 54 representative of selected disparate numerals are marked upon the face of each alpha letter key 38 in individual coextensive association with each alpha letter key 38. Numeric keys 54 are marked, or printed, and so designated that numeric keys 54 and alpha letter keys 38 are coextensive. Specifically, alpha letter keys 38 of top row 40 marked with alphabetic indicia A, I, E, L, N, S, R, T, and O are coextensive with numeric keys 54 marked with numeric indicia 1, 2, 3, 4, 5, 6, 7, 8, and 9, respectively, of top row 40. Alpha letter keys 38 of middle row 42 marked with alphabetic indicia B, C, D, F, G, H, J, K, and M are likewise coextensive with numeric keys 54 marked with numeric indicia 22, 44, 66, 77, 88, 99, and 01, respectively, of middle row 42. Alpha letter keys 38 of bottom row 44 marked with alphabetic indicia P, QU (or Q), U, V, W, Y, X, and Z are likewise coextensive with numeric keys 54 marked with numeric indicia 04, 05, 06, 07, 001, and 002, respectively, of bottom row 44.

The coextensive association of alpha letter keys 38 and numeric keys 54 are in accordance with a relationship, or algorithm, shown as follows in Table 1:

TABLE 1

| Numeral (key) | Alphabetic letter (key) |
|---|---|
| 1 | A |
| 2 | I |
| 3 | E |
| 4 | L |
| 5 | N |
| 6 | S |
| 7 | R |
| 8 | T |
| 9 | O |
| 22 | B |
| 33 | C |
| 44 | D |
| 55 | F |
| 66 | G |
| 77 | H |
| 88 | J |
| 99 | K |
| 01 | M |
| 02 | P |
| 03 | Qu |
| 04 | U |
| 05 | V |
| 06 | W |
| 07 | Y |
| 001 | X |
| 002 | Z |

The input system of translator device 26 particularly keyboard 35 includes a numeric mode actuator 56 shown in FIG. 3 keystroke operation of which generates an electronic signal that causes numeric characters 30 to appear on translator display 32. The input system particularly keyboard 35 also includes an alpha mode actuator 58 shown in FIG. 3. Upon activation of alpha mode actuator 58, keystroke operation of alpha letter keys 38 generates an electronic signal that causes an alpha letter message 60 comprising alpha letter characters 62 to appear on translator display 32.

Figure 4:
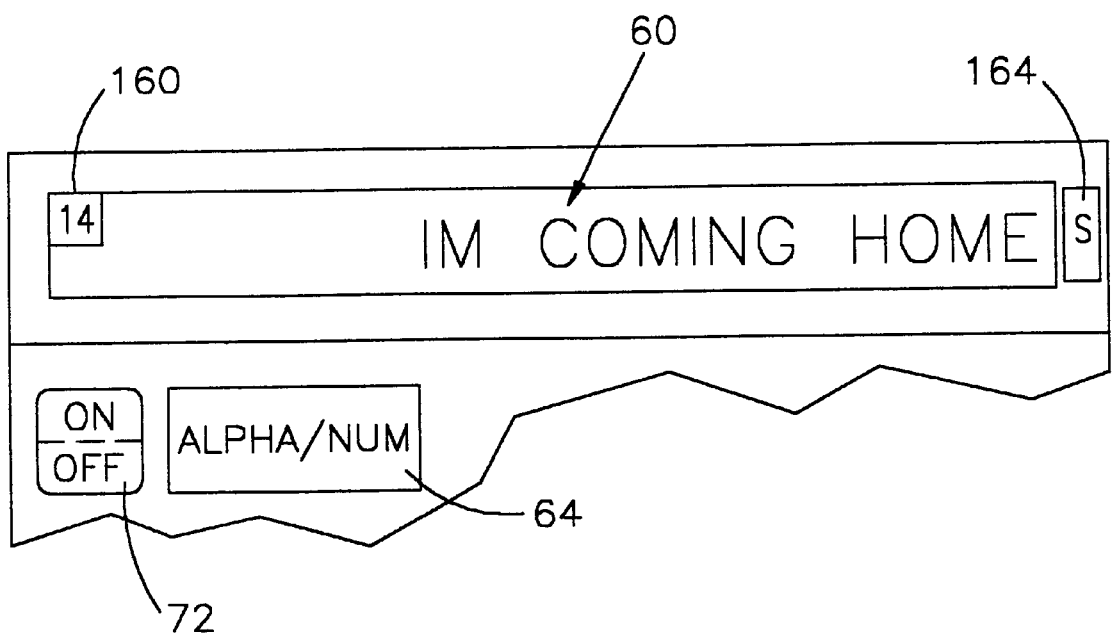
FIG. 4 is a fragmented top view of the translator device shown in FIG. 3 showing an alpha message translated from the numeric message shown in FIG. 3 on the display.

The translation of the numeric message 28 comprising the expository numeric characters 30 including asterisk symbols (*) 31 shown in FIG. 3 in accordance with the algorithm shown in Table 1 is shown in FIG. 4 as IM COMING HOME. Alpha characters 62 enter from the right side of translator display 32 and move to the left.

Numeric mode actuator 56 and alpha mode actuator 58 can be optionally combined into a single alpha-numeric actuator 64 as shown in FIG. 5A operation of which alternately causes an alpha mode of operation or a numeric mode of operation causing either numeric characters 30 or alpha characters 62 to appear on translator display 32.

The algorithm shown in Table 1 is the basis for the conversion of an alpha message 60 into encoded numeric message 28. The algorithm of Table 1 is also the basis for the conversion of a coded numeric message 28 into an alpha message 60.

As shown in FIG. 5, keyboard 35, which includes alpha letter keys 38, numeric keys 54, numeric actuator 56, and alpha actuator 58, is coupled to a central processing unit (CPU) 66, which is coupled to RAM memory module 68 or has a memory module within. A DC power source, which can be either a battery (not shown) or an external AC/DC power source (not shown), is connected to a power on-off switch 70 connected to a power on-off actuator 72 shown in FIG. 3 on keyboard 35. Operation of power on-off switch 70 shuts down both translator circuit 34 and notebook electrical circuit 36. A clear actuator 74, printed with an abbreviation for clear, "CL" on keyboard 35 as shown in FIG. 3, is connected to a temporary power interrupter, or default mode, switch 76 that is connected to both translator circuit 34 and personal notebook electrical circuit 36. Operation of clear actuator 74 in turn operates switch 76 so as to cause both translator circuit 34 and personal notebook electrical circuit 36 whichever is in an active mode to default to a basic state of operation which keeps translator circuit 34 active while personal notebook electrical circuit 36 is inactivated.

CPU 66 is connected to an alpha mode module 78 and a numeric mode module 80 both of which are coupled to translator display 32. Alpha mode module 78 is activated by alpha mode actuator 58 shown in FIG. 3, and numeric mode module 80 is activated by numeric mode actuator 56 also shown in FIG. 3. Keystroke operation of alpha mode module 78 allows alpha characters 62 to be presented on translator display 32 upon keystroke operation of alpha letter keys 38. Keystroke operation of numeric mode module 80 allows numeric characters 30 to be presented on translator display 32 upon keystroke operation of numeric keys 54.

Numeric mode actuator 56 and alpha mode actuator 58 can be combined into an optional single, or combined, alpha/numeric actuator 82, which is shown in FIG. 5A. The block diagram of FIG. 5A indicates an optional combined alpha/numeric mode module 84 that is in operative relationship with optional alpha/numeric actuator 82.

When translator display 32 is empty and alpha actuator 58 is activated, alpha message 60 can be directly entered by keystroke operation of selected alpha letter keys 38 so that alpha letter characters 62, for example, IM COMING HOME, are caused to appear on translator display 32. In a similar manner, when translator display 32 is empty and numeric actuator 56 is activated, numeric message 28 can be directly entered by keystroke operation of selected numeric keys 54 so that numeric characters 30, for example, 01*339012566*779013, are caused to appear on translator display 32.

An algorithm translator module 86 shown in FIG. 5 has been loaded with the alpha-numeric relationships set forth in Table 1 and is in addition in operational relationship with numeric actuator 56 and with alpha actuator 58. When translator device 26 is in the alpha mode of operation, and numeric actuator 56 is activated, alpha characters 62 appearing on translator display 32 are translated by translator module 86 to numeric characters 30 for display upon translator display 32. Similarly, when translator device 26 is in the numeric mode of operation, and alpha actuator 58 is activated, numeric characters 30 appearing on translator display 32 are translated by translator module 86 to alpha characters 62 for display upon translator display 32. For example, when expository numeric message 28, 201*339012566*779013, is shown on translator display 32 and alpha actuator 58 is activated, translator module 86 translates the numeric message 28 to alpha message 60, IM COMING HOME, for display on translator display 32. In furtherance of the expository example, when translator device 26 is in the alpha mode of operation and alpha message 60 IM COMING HOME being displayed upon translator display 32 and numeric actuator 56 is activated, translator module 86 translates the alpha message 60 to numeric message 28, 201*339012566*779013, for display on translator display 32.

The input system of translator device 26 particularly keyboard 35 includes a space actuator 88 located on upper portion 46 coupled to keyboard 35 and CPU 66. Space actuator 88 is designated as "*=SPACE". Keystroke operation of space actuator 88 when translator device 26 is in the numeric mode results in an asterisk symbol (*) 31 filling one of the 20 slots of translator display 32. Two asterisk symbols (*) 31 are shown in expository message 28, 01*339012566*779013. Upon keystroke operation of space actuator 88 in the alpha mode, with the expository alpha message, IM COMING HOME, as an example, empty slots, or spaces, occur between IM and COMING and between COMING and HOME. By way of example, in the alpha mode of operation, keystroke entry of IM is followed by keystroke operation of space actuator 88 as a word break, and again keystroke entry of COMING is followed by keystroke operation of space actuator 88 as a word break.

Algorithm translator 86 detects the entry of like numeric characters in sequence and causes entry of an asterisk (*) 31 on translator display 32 in the numeric mode between successive numeric characters 30 both upon keystroke operation of the same numeric key 54 in sequence and also upon keystroke operation of two different numeric keys 54 in sequence resulting in entry on translator display 32 of successive numeric characters. For example, the word TOLD in the alpha mode becomes 894*44 in the numeric mode. The automatic entry of the asterisk (*) 31 in the numeric mode prevents the entry of three numeric characters "4" in sequence would not distinguish between L and d in the proper order. Also, the possible use of entire bundle of numeric characters 444 for other purposes would not be possible. In addition, algorithm translator module 86 in detecting like numeric characters 30 in sequence in the numeric mode automatically deletes blank slot in the alpha mode so that the word TOLD appears without separation on tanslator display 32 in the alpha mode.

When translator device 26 is in the numeric mode of operation and algorithm translator module 86 receives a signal by way of alpha actuator 58 to translate from the numeric mode to the alpha mode for entry on translator display 32, a blank space is transmitted to, or is caused to be displayed at, the designated slot in translator display 32 in place of an asterisk symbol (*) 31 in the alpha mode. When during the alpha mode of operation, algorithm translator module 86 receives a signal by way of numeric actuator 58 to translate from the alpha mode to the numeric mode for entry on translator display 32, an asterisk (*) symbol 31 is transmitted for display to the designated slot on translator display 32 in place of any blank slot in the alpha mode.

Figure 7:
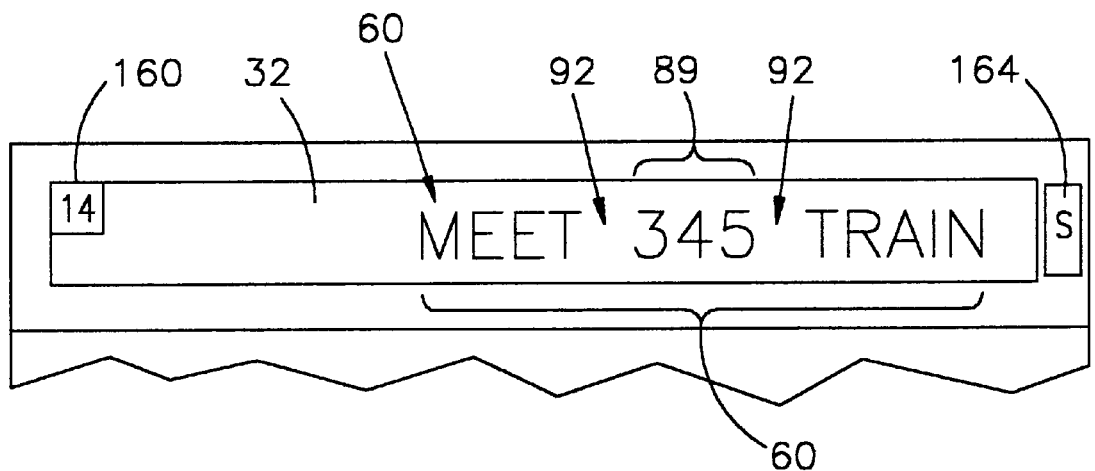
FIG. 7 is a fragmented view of the translator device with an alpha message including a numeric characteristic representing a numeral.

Numeric keys 54 are responsive to keystroke operation in the alpha mode of operation resulting in displaying on translator display 32 one or more numeric characters 89 representing at least one number. For purposes of exposition, FIG. 7 shows an alpha message 60, namely, "MEET 345 TRAIN" on translator display 32, with 3, 4, and 5 representing numeric characters 89 in the alpha mode that represent numbers 3, 4, and 5. This operation in the alpha mode is accomplished by keystroke operation of a numeric signal key 91, which on keyboard 35 is designated as "BEGINS/ENDS NUMBERS 09". In the alpha mode of operation, keystroke entry of numeric signal key 91 results in a signal to translator module 86 that subsequent keystroke entry of numeric keys 54 results in numeric characters 89 in the alpha mode appearing on translator display 32. After entry of numeric characters 89 in the alpha mode, a subsequent keystroke entry of numeric signal key 91 after the last entry of numeric characters 89 in the alpha mode results in a signal to translator module 86 that keystroke entry of numeric keys 54 will no longer result in numeric characters appearing on translator display 32 in the alpha mode of operation. Another result of keystroke entry of numeric signal key 91 in the alpha mode of operation is that a signal is sent to translator module 86 that a blank slot 92 in the alpha mode is entered and displayed on translator display 32 in the slot before the subsequent keystroke entry of a numeric key 54. Also, entry of numeric signal key 91 in the alpha mode after entry of the last numeric character 89 in the alpha mode sends a signal to translator module 86 that a blank slot 92 in the alpha mode is entered and displayed on translator display 32 in the slot after the entry of the last numeric character 89 in the alpha mode. In the expository message shown in FIG. 7, blank slots 92 in the alpha mode are shown immediately before the first numeric character 3 representing the number 3 and immediately after the last numeric character 5 representing the number 5.

Figure 8:
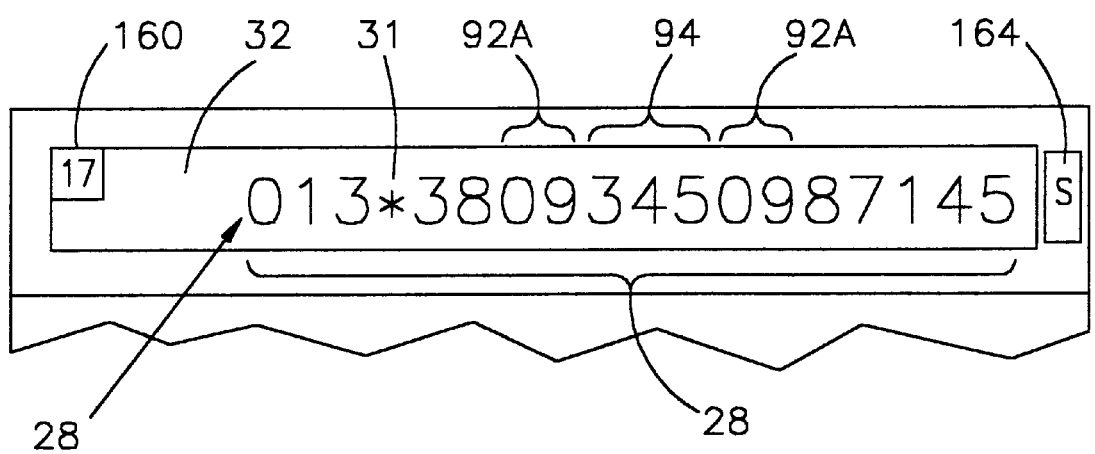
FIG. 8 is a fragmented view of the translator device with a numeric message translated from the alpha message shown in FIG. 6.
Figure 9:
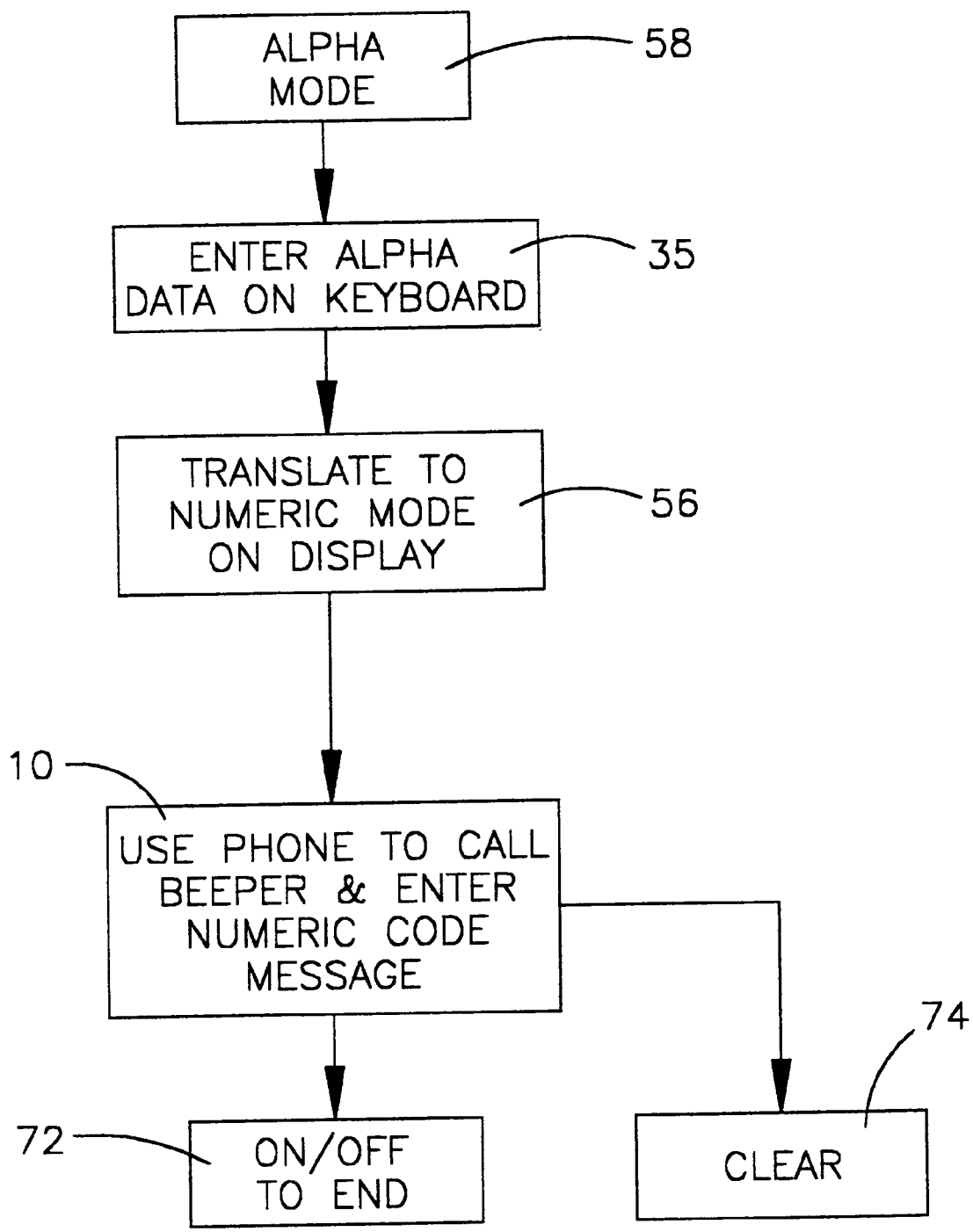
FIG. 9 is a flow chart that illustrates the steps taken by a message sender using the translator device to prepare an alpha message and translation into a numeric message on the translator display for transmittal on the keypad of a telephone to a numeric pager.

Translation of an alpha message 60 into a numeric message 28 by keystroke operation of numeric actuator 56 results in numeric characters 94 in the numeric mode associated with numeric characters 89 in the alpha mode in the alpha mode being displayed on translator display 32. FIG. 8 shows the translation of expository alpha message MEET 345 TRAIN to expository numeric message "013*38093450987125". As indicated, blank slot 92 in the alpha mode is translated to the numeric mode in the form of numeric signal character 09 onto translator display 32 in the display slots immediately before and after the first and last numeric characters 94, namely, 3 and 5.

In a similar manner, as indicated in FIG. 8, direct keystroke operation of numeric signal key 91 in the numeric mode results in the display of an actual numeric signal 92A in the numeric mode in the particular form of numeric character 09 on translator display 32. That is, a numeric message 28 includes numeric characters 94 that are associated with numeric characters 89 in the alpha mode. In addition, translation of a numeric message 28 to an alpha message 60 by keystroke operation of alpha actuator 58 results in blank slot entries 92 in the alpha mode in the slots directly before and following the display of numeric characters 89 in the alpha mode on translator display 32.

Figure 10:
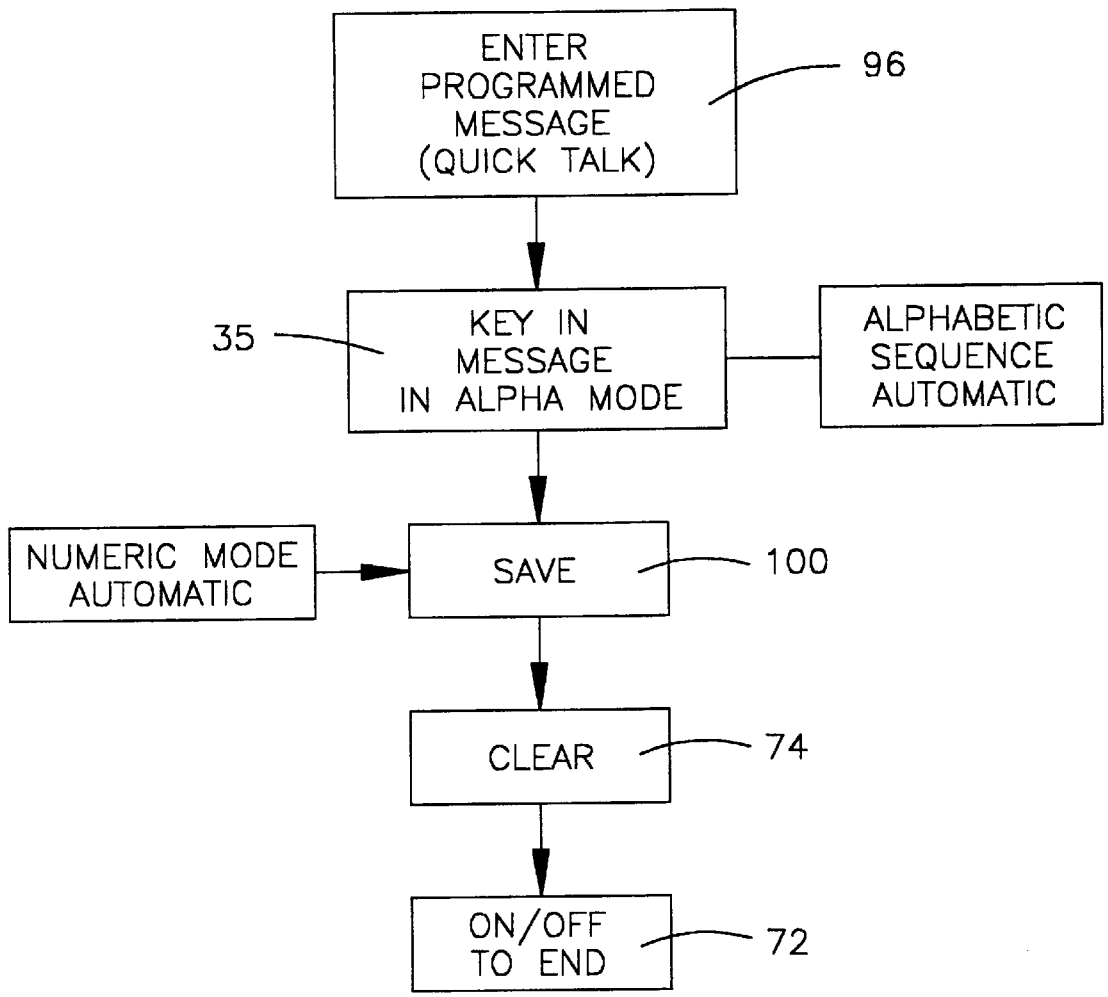
FIG. 10 is a flow chart that illustrates the steps taken for a user to enter and save a programmed message (designated Quick Talk) for later display.

A programmed messages actuator 96, designated as "QUICK TALK", in FIG. 3 is responsive to keystroke operation as illustrated in the flow chart of FIG. 10 for entering a personal programmed message menu in programmed messages module memory 98 in translator electrical circuit 34 shown in FIG. 5. Activation of programmed messages actuator 96 is followed by entry into RAM 99A

(FIG. 5) of an alpha message onto translator display 32 by keystroke operation of alpha letter keys 38. Then activation of a programmed messages save actuator 100 associated with programmed messages actuator 96, designated SAVE on keyboard 35 in FIG. 3, results in automatically storing the alpha message into ROM 99B in an empty location in programmed messages memory module 98. Storage in the alpha mode automatically results in a simultaneous storage of the programmed message in the numeric mode by action of translator module 86.

Figure 11:
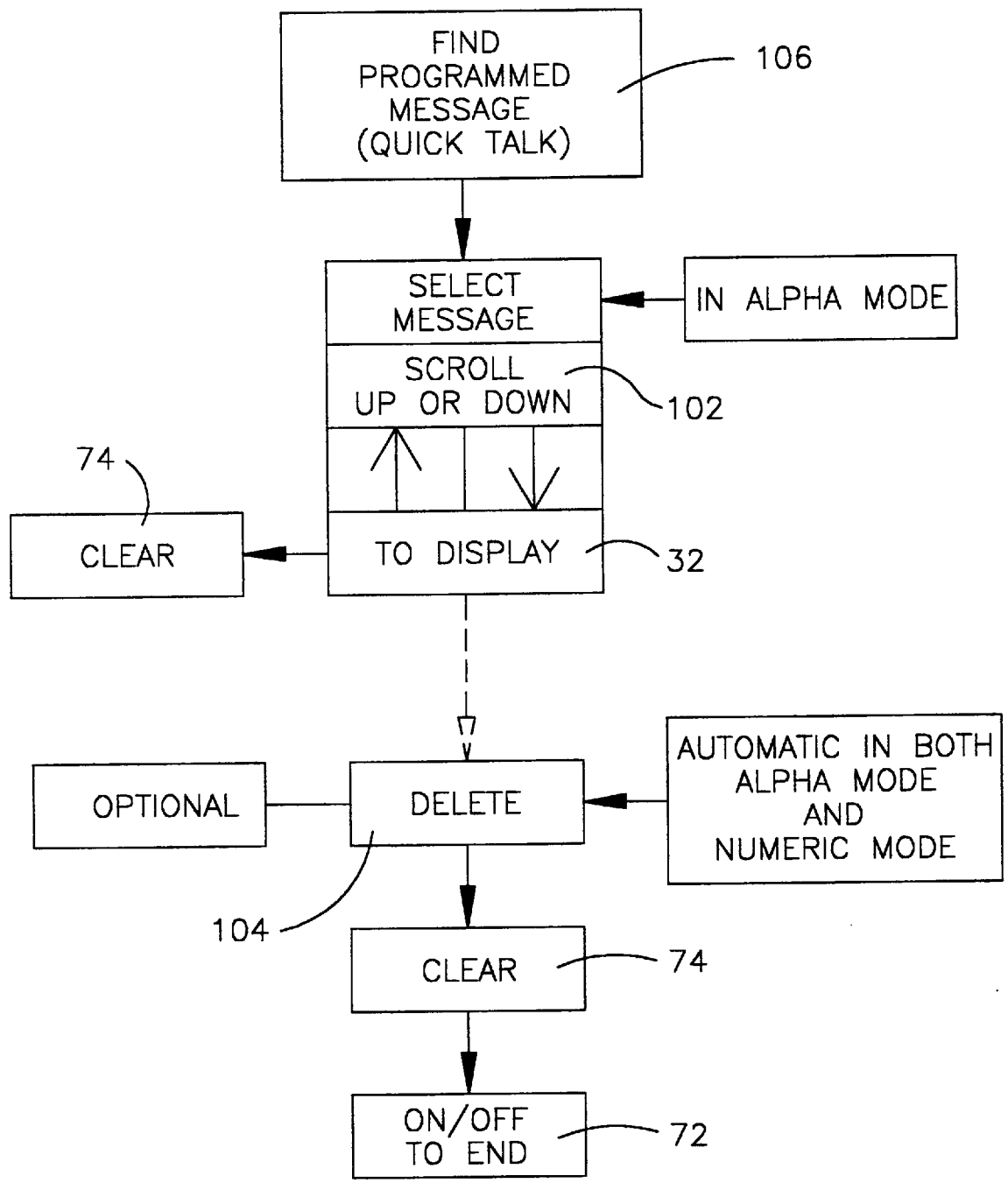
FIG. 11 is a flow chart that illustrates the steps taken to find a programmed message (Quick Talk) for display and optionally to delete the programmed message.

Any one of a number of stored programmed messages (Quick Talk) can be selected for recall from its particular location in programmed messages memory module 98 as shown in the flow chart of FIG. 11. Activation of a programmed messages up-and-down arrowed scroll 102 associated with programmed messages actuator 96 on keyboard 35 searches the locations of all the programmed messages locations in programmed messages memory module 98, generally in the alpha mode for ease of message recognition. After the alpha message is selected and read, further action may be desired and keystroke operation of numeric actuator 56 translates the alpha message on translator display 32 into a numeric message on translator display 32. Keystroke operation of clear actuator 74 returns translator electrical circuit 34 from the menu of programmed messages actuator 96 to its basic select mode, or default mode, as illustrated in the flow chart in FIG. 10.

Any of a number of programmed messages stored in programmed messages memory module 98 can be deleted as shown in FIG. 11. Keystroke activation of programmed messages actuator 96 activating the menu of the programmed messages followed by operation of programmed messages up-and-down arrowed scroll 102 allows the slots, or locations, containing alpha messages in programmed messages memory module 98 to appear on translator display 32 until the desired programmed message appears on translator display 32 in the alpha mode. Keystroke operation of programmed messages delete actuator 104 in association with programmed message actuators 96, designated DELETE on keyboard 35, results in the removal of the programmed message on translator display 32 designated to be removed from programmed messages memory module 98 in both the alpha mode and the numeric mode. Keystroke operation of clear actuator 74 returns electrical circuit 34 from the menu of programmed messages actuator 96 to its basic select mode, or default mode, as illustrated in the flow chart in FIG. 11.

Messages that have been entered on translator display 32 either in the alpha mode or the numeric mode for purposes of transmittal from a telephone 10 or of translation from the numeric mode to the alpha mode from a receiver side pager 23 can be saved and later recalled for purposes of record, reminder, or reuse for transmittal from telephone 10 to a pager.

A saved messages actuator 106, designated with the indicia "MSGS" as an abbreviation for messages shown on keyboard 35 in FIG. 3 can be optionally activated for storing an alpha message and a numeric message in a number of locations in a saved messages memory module 108 and RAM 113A coupled with saved messages actuator 106 as shown in FIG. 5. As illustrated in the flow chart of FIG. 12, when either a numeric message 28 or an alpha message 60 is shown on translator display 32, keystroke operation of a saved messages save actuator 110 on keyboard 35 automatically stores both numeric 28 and alpha message 60 into one of the empty locations in save messages memory module 108 and associated ROM 113B. After the message has been saved, keystroke operation of clear actuator 74 clears translator display 32 and returns the operation of electrical circuit 34 from the menu of saved messages actuator 106 to its basic select mode, or default mode.

Figure 13:
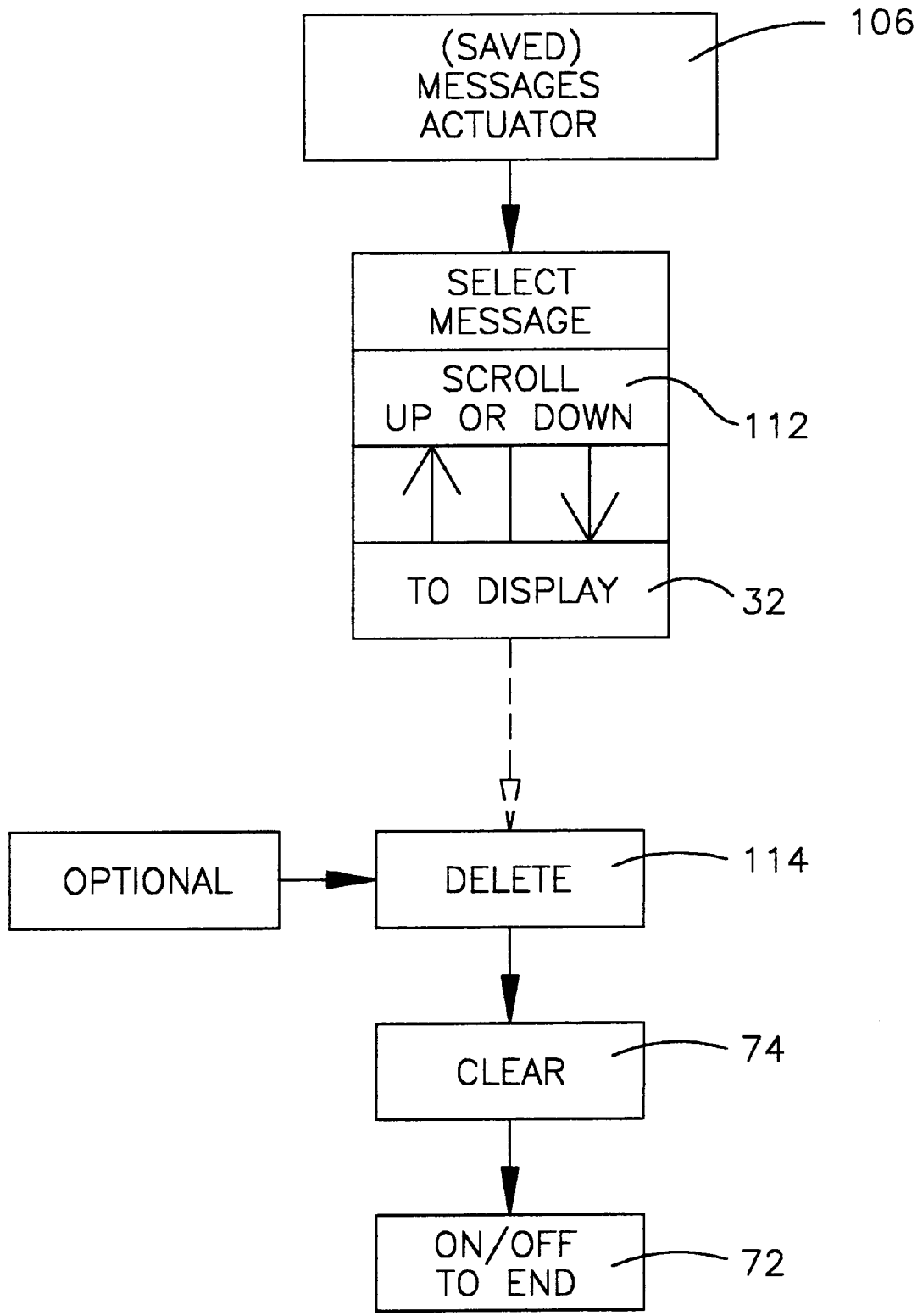
FIG. 13 is a flow chart that illustrates the steps taken for a user to find and select and display a previously saved message.

Retrieval of a saved message after operation of saved messages save actuator 110 is accomplished as shown in the flow diagram of FIG. 13 by keystroke operation of saved messages actuator 106 followed by operation of an arrowed up-and-down saved messages scroll 112 to the location of the particular saved message for showing on translator display 32. The displayed message is generally in the alpha mode but activation of numeric actuator 56 translates the alpha message into a numeric message that can be, for example, transmitted from telephone 10 to numeric pager 22.

A saved message can be deleted from saved messages memory module 108 as shown in the flow chart of FIG. 13 by keystroke operation of saved messages actuator 106 followed by operation of up-and-down scroll 112 until the message selected for deletion appears on translator display 32. Keystroke activation of a saved messages delete actuator 114 located on keyboard 35 as shown in FIG. 3 that is coupled to saved messages memory module 108 deletes the saved message in both the alpha mode and the numeric mode. After the message has been deleted, keystroke operation of clear actuator 74 clears translator display 32 and returns the operation of electrical circuit 34 from the menu of saved messages actuator 106 to its basic select mode, or default mode, as illustrated in the flow chart in FIG. 13.

Thirty-four preprogrammed, or canned, message keys 116 are located on lower portion 50 of keyboard 35. Word key 48, that is the key designated YOU in upper portion 46, is also one of the canned message keys 116, so that a total of 35 canned message keys 116 are located on keyboard 35. Canned message keys 116 are printed with indicia or symbols indicating optional alpha or abbreviated or symbol messages designated generally as a canned alpha messages 118 that appear as alpha messages on display 32 upon activation of canned message keys 116 in the alpha mode, and further are coextensively printed with canned numeric messages 120 that appear as numeric messages on display 32 upon activation of canned message keys 116 in the numeric mode.

The coextensive association of canned alpha messages 118 and canned numeric messages 120 related to canned message keys 116 are in accordance with a relationship shown as follows in Table 2:

TABLE 2

| Canned Numeric Message | Canned Alpha Message |
|---|---|
| 08 | you |
| 11 | (ID) (identification) |
| 003 | ? |
| 004 | ing |
| 005 | come |
| 006 | did |
| 007 | forgot! |
| 008 | going |
| 009 | good |
| 0001 | have |
| 0002 | hope |
| 0003 | how |
| 0004 | love |
| 0005 | miss |
| 0006 | thanks |
| 0007 | today |
| 0008 | tomorrow |

TABLE 2-continued

| Canned Numeric Message | Canned Alpha Message |
|---|---|
| 0009 | tonight |
| 111 | want |
| 222 | what |
| 333 | when |
| 444 | where |
| 555 | with |
| 666 | yes/OK |
| 1111 | meet me at |
| 2222 | pick me up |
| 3333 | urgent! call ASAP |
| 4444 | leaving now |
| 5555 | change of plans |
| 6666 | don't forget to |
| 7777 | thinking of you |
| 8888 | running late be there at |
| 9999 | E/R (error/repeat) |

Before operating canned message keys 116, selection is made of either the alpha mode or the numeric mode by keystroke operation of either alpha actuator 58 or numeric actuator 56. Each of canned message keys 116 are responsive to keystroke operation resulting in the entry on translator display 32 of canned alpha characters in the alpha mode comprising canned alpha message 118 or the entry on translator display 32 of canned numeric characters in the numeric mode comprising canned numeric message 120. Entry of canned message keys 116 in the alpha mode results in a canned alpha message 60 that is a part of an total alpha message 60 being keyed in on keyboard 35 for display on translator display 32.

Figure 12:
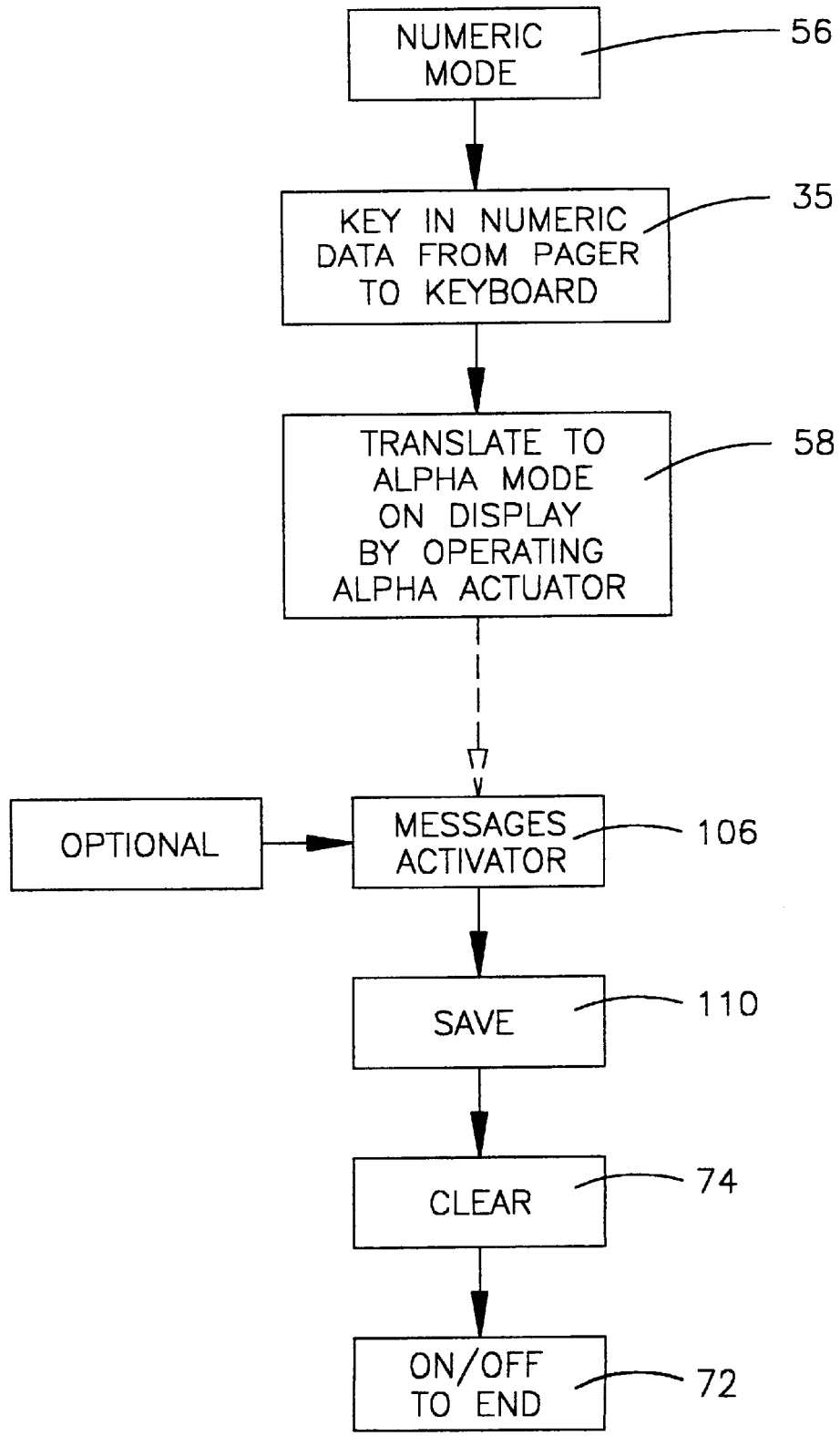
FIG. 12 is a flow chart that illustrates the steps taken by a user at the pager end using the translator device to decode a numeric message received on a numeric pager into an alpha message on the translator display; and further shows the steps optionally to save the received message.

As shown in the flow chart of FIG. 12, keystroke entry of numeric actuator 56 results in a numeric message 28 that is keyed onto telephone keypad 12 for dispatch to numeric pager 22. The numeric message 28 that appears on pager screen 24 is then copied onto translator device 26A that is located at the message receiver end by numeric pager 22 by keystroke operation of numeric keys 54. Keystroke entry of alpha actuator 58 translates numeric message 28 to the final alpha message 60.

Figure 6:
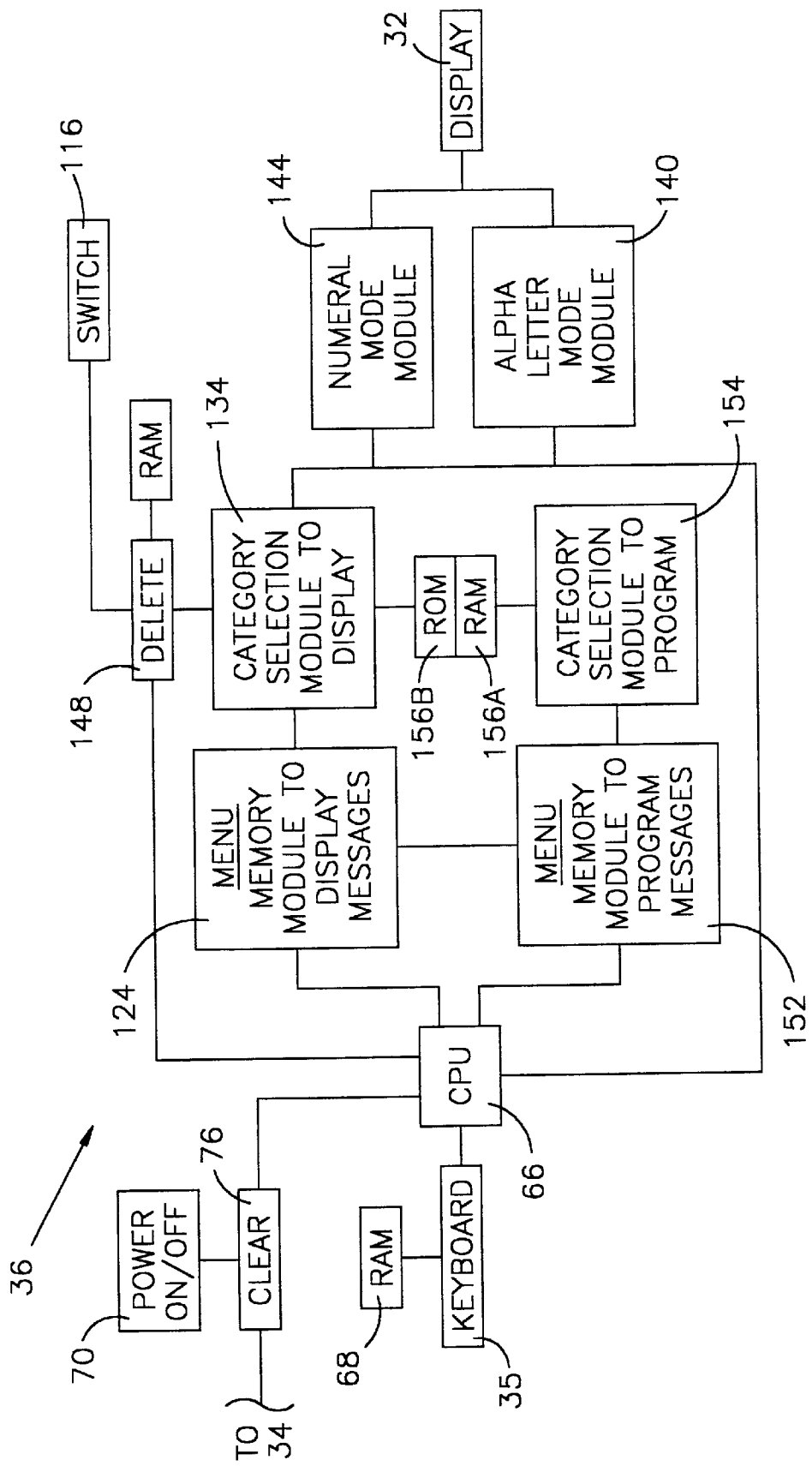
FIG. 6 is an electrical block diagram illustrating the personal notebook mode of the translator device.

Personal notebook electrical circuit 36, shown in FIG. 6, is coupled to clear actuator 74 that is turn is coupled to default switch 76 that is connected to translator electrical circuit 34. Personal notebook electrical circuit 36 is also coupled to CPU 66. A find menu actuator 122, designated as FIND on keyboard 35, is coupled to a menu memory module 124 to activate for display three message categories 126 (FIG. 12). The first message category is represented by a phone book category 126 associatee with a phone book actuator 128A printed with the abbreviated designation for phone book, namely, PHBK on keyboard 35, which upon keystroke activation opens a number of phone book subcategories, or slots; the second category is represented by a personal reminder category 130 associated with a personal reminder actuator 130A printed with the designation REMIND on keyboard 35, which upon keystroke activation opens a number of reminder file subcategories, or slots; and the third category is represented by three personal codes 130 associated with personal code actuators 132A, 132B, and 132C that on keyboard 35 are each printed with the designation P.C. which are additionally printed with the numerals 777, 888, and 999, respectively. A category selection module 134 is coupled to menu memory module 124 as shown in FIG. 6 that is associated with each category actuator 128A, 130A, and 132A, 132B, and 132C. An up-and-down arrowed scroll 136 positioned on keyboard 35 adjacent to find menu actuator 122 is coupled to phone book actuator 128 and to personal reminder actuator 130A and is also coupled to category selection module 134.

An alpha letter mode actuator 138, printed with the abbreviation LTR for letter on keyboard 35, is coupled to an alpha letter mode module 140 shown in FIG. 6 that is connected to translator translator display 32. A numeral mode actuator 142, printed with the abbreviation NUM for numeral on keyboard 35, is coupled to a numeral mode module 144 that is connected to translator display 32. Alpha letter mode module 140 and numeral mode module 144 are independent of one another. Keystroke activation of alpha letter mode actuator 138 and numeral mode actuator 142 results in display of alpha letter characters and numeral mode characters on translator display 32, respectively, held in memory in category selection module 134. Each of three categories of messages 126 has an alpha letter mode message with alpha letter characters and a separate numeral mode message with numeric characters that are related to one another only in a personal sense.

As example, after activation of alpha letter mode actuator 138 and activation of find menu actuator 122 followed by operation of phone book category actuator 128A and finally after repeated activation of up-and-down arrowed scroll 136, a series of message locations holding various alpha character names in alphabetic order results in a particular name being sought appearing on translator display 32. For purposes of exposition, the name FRANK SMITH eventually appears on translator display 32. Then activation of numeral mode actuator 142 results in a telephone number being shown on translator display 32 in numeric characters in the phone book category, indicated as 456-7890 for purposes of exposition. The relationship between 456-7890 and FRANK SMITH is personal to the user.

In an analogous manner, activation of find menu actuator 122 followed by operation of alpha letter mode actuator 138 and activation of personal reminder category actuator 130A followed by activation of scroll 136 brings onto translator display 32 a series of message slots results in the display on translator display 32 of a selected slot that contains a message that appears on translator display 32. For example, a personal message, CALL MARY SMITH, can appear on translator display 32 following this procedure. Activation of numeral mode actuator 142 results in a numeric character message telephone number, 123-4567, selected for purposes of exposition, appearing on translator display 32. The relationship between CALL MARY SMITH and 123-4567 is personal to the user only.

In an analogous manner, activation of find menu actuator 122 followed by activation of alpha letter mode actuator 138 in turn followed by a selected one of the personal code actuators 132A, 132B, or 132C, results in particular alpha character message to appear on translator display 32. For example, as shown in FIG. 7, upon activation of P.C. actuator 132A, an alpha character message MEET ME AT STATION, presented for purposes of exposition, appears on translator display 32. Then activation of numeral mode actuator 142 results in the numeric characters 777, for example, to appear on translator display 32. Numeral mode messages 777, 888, and 999 of keys 132A, 132B, and 132C cannot be altered because they are factory set. Each P.C. key 132A, 132B, and 132C has a unique alpha character message. Each unique alpha character message would be contained in each personal code category 132 of both translator device 26 at the sender side and translator device 26A at the receiver end.

Phone book category messages 128 and reminder messages 130 are used as personal notebooks by a user. Personal code numeric codes 777, 888, 999, however, are used as aids to transmit messages from a sender with the aid of a translator device 26 to a numeric pager 22 of a receiver having a translator device 26A which is used to translate numeric messages from the sender. For example, activation of find menu actuator 122 and numeral mode actuator 142 and then activation of one of the personal code category actuators 132A, 132B, and 132C causes one of the numeral messages 777, 888, or 999 to appear on translator display 32. The particular numeric character message, 777, 888, or 999, as the case may be, is then transmitted to numeric pager 22 by entry of the particular numeric message selected on telephone keypad keys 14. In the expository example above, after entry of 777 in numeric mode by keystroke of numeric keys 54 in translator device 26A at the receiver end where numeric pager 22 is located and activation of alpha actuator 58, the alpha character message MEET ME AT STATION appears on translator display 32 of translator device 26A.

A delete actuator 146 on lower portion 50 of keyboard 35 is coupled to a delete module 148 shown on FIG. 6 coupled to category selection module 134. As set forth in FIG. 14, activation of delete actuator 146 results in the removal of a message in a selected location of a selected category of the selected alpha mode or numeral mode after operation of arrowed up-and-down scroll 136 to display the message to be deleted on screen. Entry of alpha letter actuator 138 and the entry of either phone book category actuator 128A or remind category actuator 130A is followed by operation of scroll 136 to the location in category selection module 134 that holds the message to be deleted. Delete actuator 146 is then actuated to remove the alpha message. Numeral mode actuator 142 is then activated to display the associated numeric mode message and delete actuator 146 is again actuated. Keystroke entry of clear actuator 74 returns the system to the default mode. Keystroke entry of on/off actuator 72 shuts down translator device 26.

Figure 14:
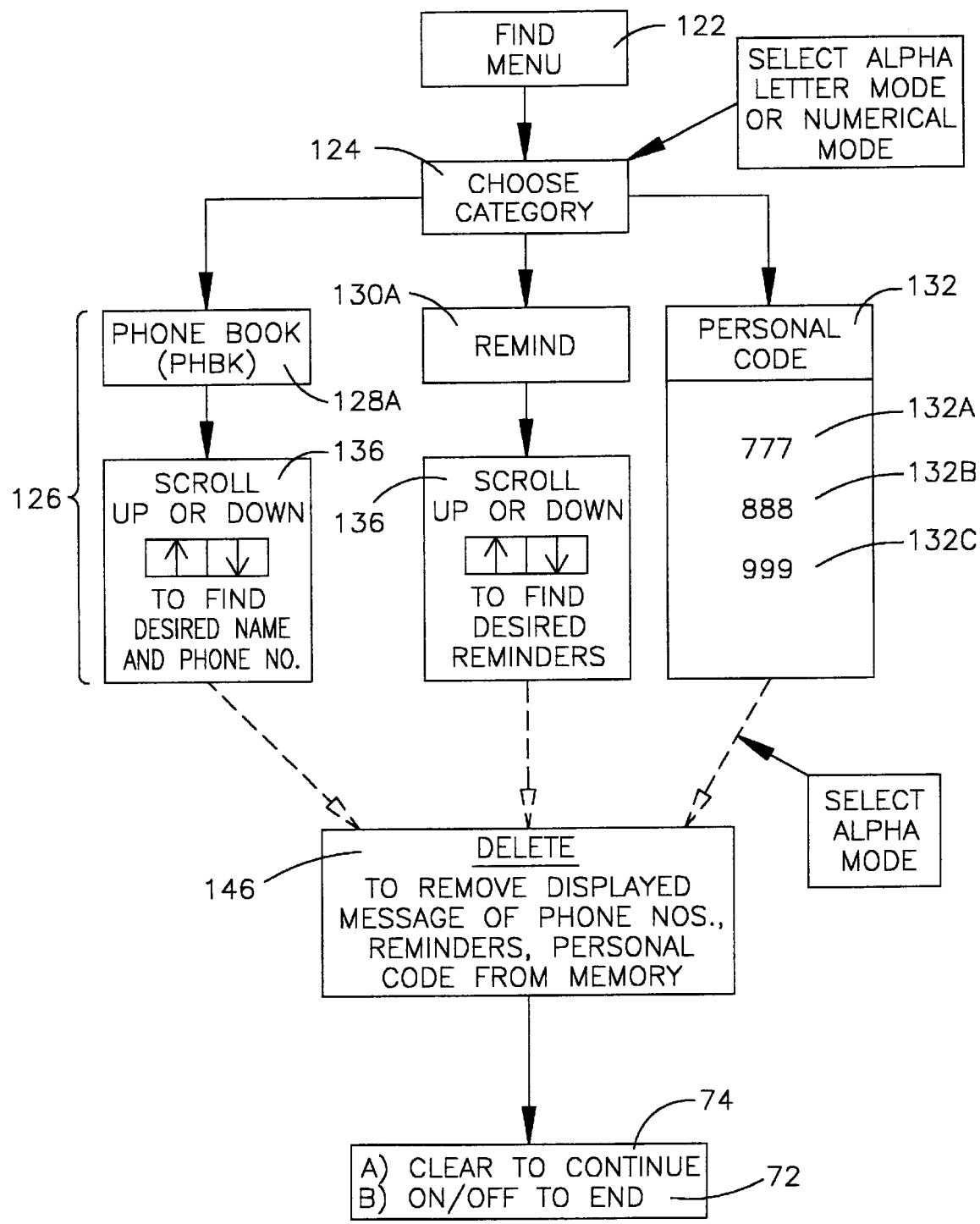
FIG. 14 is a flow chart that illustrates the steps taken to select (Find Menu) any one of personal messages from the three basic categories of the personal notebook electrical circuit.

In further operation of the deletion process, as shown in the flow chart of FIG. 14, any of personal code categories actuators, namely, phone book actuator 128A, personal reminder actuator 130A, and personal code actuators 132A, 132B, and 132C are can be activated together with entry of alpha letter actuator 138 followed by operation of scroll 136 to the location of the particular alpha message to be deleted is found. Then, entry of delete actuator 146 causes the removal of the particular alpha letter message associated with the selected personal code category stored in category selection module 134 is removed.

Figure 15:
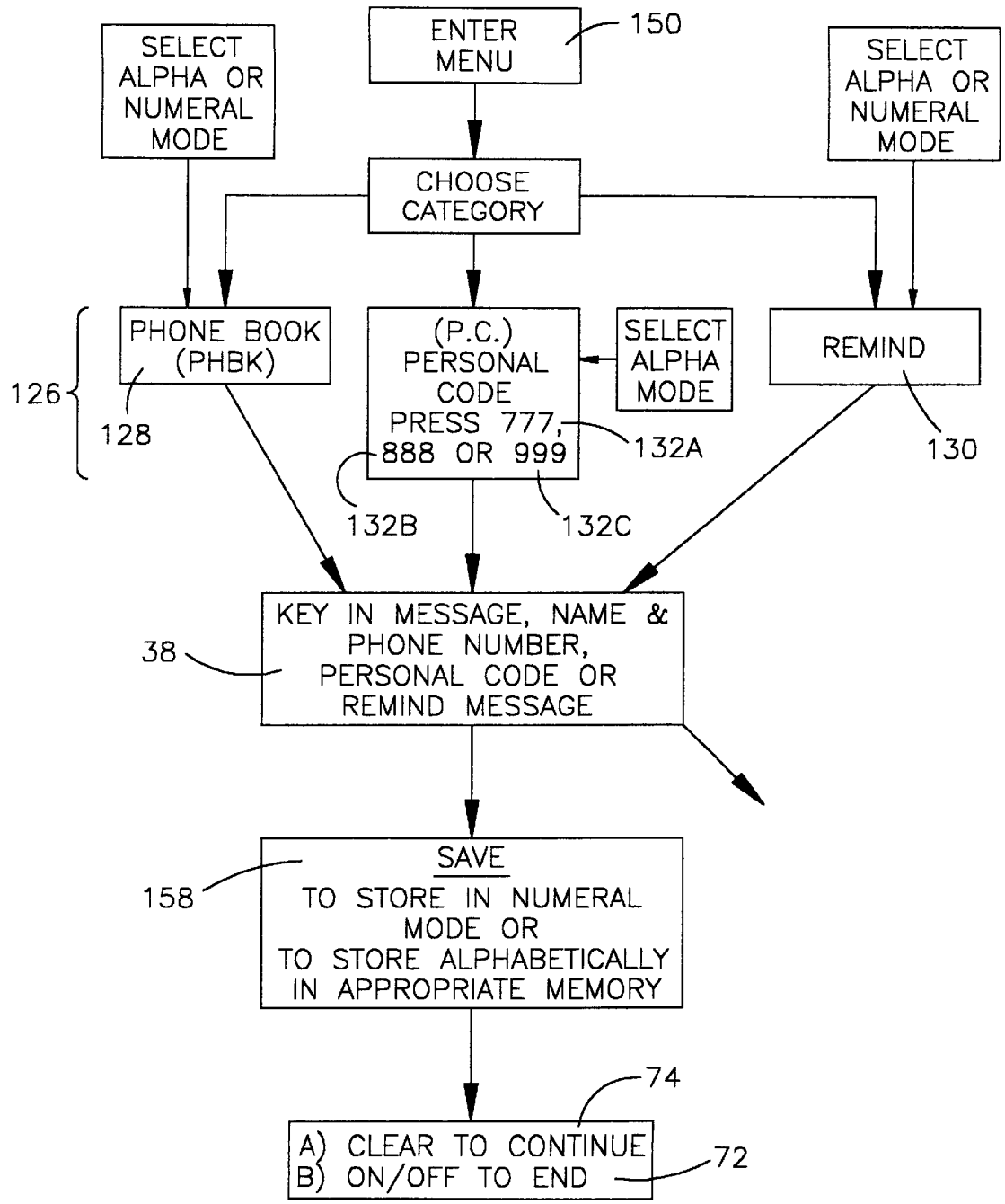
FIG. 15 is a flow chart that selects one of three personal notebook categories and illustrates the steps taken to enter and save personal notebook messages in the selected category.

Personal notebook electrical circuit 36 also includes an enter menu actuator 150, designated as ENTER on keyboard 35 as shown in FIG. 3, which is coupled to a menu memory module 152 that is coupled to CPU 66 (FIG. 6). As set forth in FIG. 15, keystroke entry of enter menu actuator 150 results in the activation for subsequent display three message categories 126 followed by a selection and activation of one of phone book actuator 128A, of personal reminder actuator 130A, or one of personal code actuators 132A, 132B, and 132C, namely personal codes 777A, 888A, and 999A, respectively, all of which are in stored in category selection module 154.

When either phone book actuator 128A or personal reminder actuator 130A has been activated, either the alpha letter mode or the numeral mode is selected by entry either of alpha letter actuator 138 or numeral mode actuator 142. If alpha letter actuator 138 is operated first, then keystroke entry of alpha letter keys 38 on keyboard 35 results in the entry of the desired alpha character message into RAM 156A (FIG. 6) for storage in an empty location in an alphabetic order in category selection module 154 and associated ROM 156B. Activation of a save actuator 158 on keyboard 35 and associated with category selection module 154 stores the entered message in the alpha mode in alphabetic sequence in the alpha letter mode. Activation of numeral mode actuator 142 is then followed by keystroke operation of numeric keys 54 on keyboard 35 results in the entry of the desired numeric character message into RAM 156A then ROM 156B (FIG. 6) for storage in category selection module 154. Activation of save actuator 158 on keyboard 35 stores the entered message in ROM 156B in the numeric mode in numeric sequence. Entry of clear actuator 74 results in clearing of translator display 32 and returning translator device 26 to the basic default mode. Entry of on/off actuator 72 turns off translator device 26.

After activation of enter menu actuator 150 and one of personal codes actuators 132A, 132B, or 132C are selected, alpha letter actuator 138 is activated. If a message appears on translator display 32, delete actuator 146 is activated in order to clear translator display 32 as previously explained. Keystroke operation of alpha letter keys 38 on keyboard 35 results in an alpha character message appearing on translator display 32. Save actuator 158 is then activated for storage of the alpha character message in ROM 156B category selection module 154 for subsequent recall. Activation of clear actuator 74 clears translator display 32 and returns translator device 26 to the basic default mode.

Figure 16:
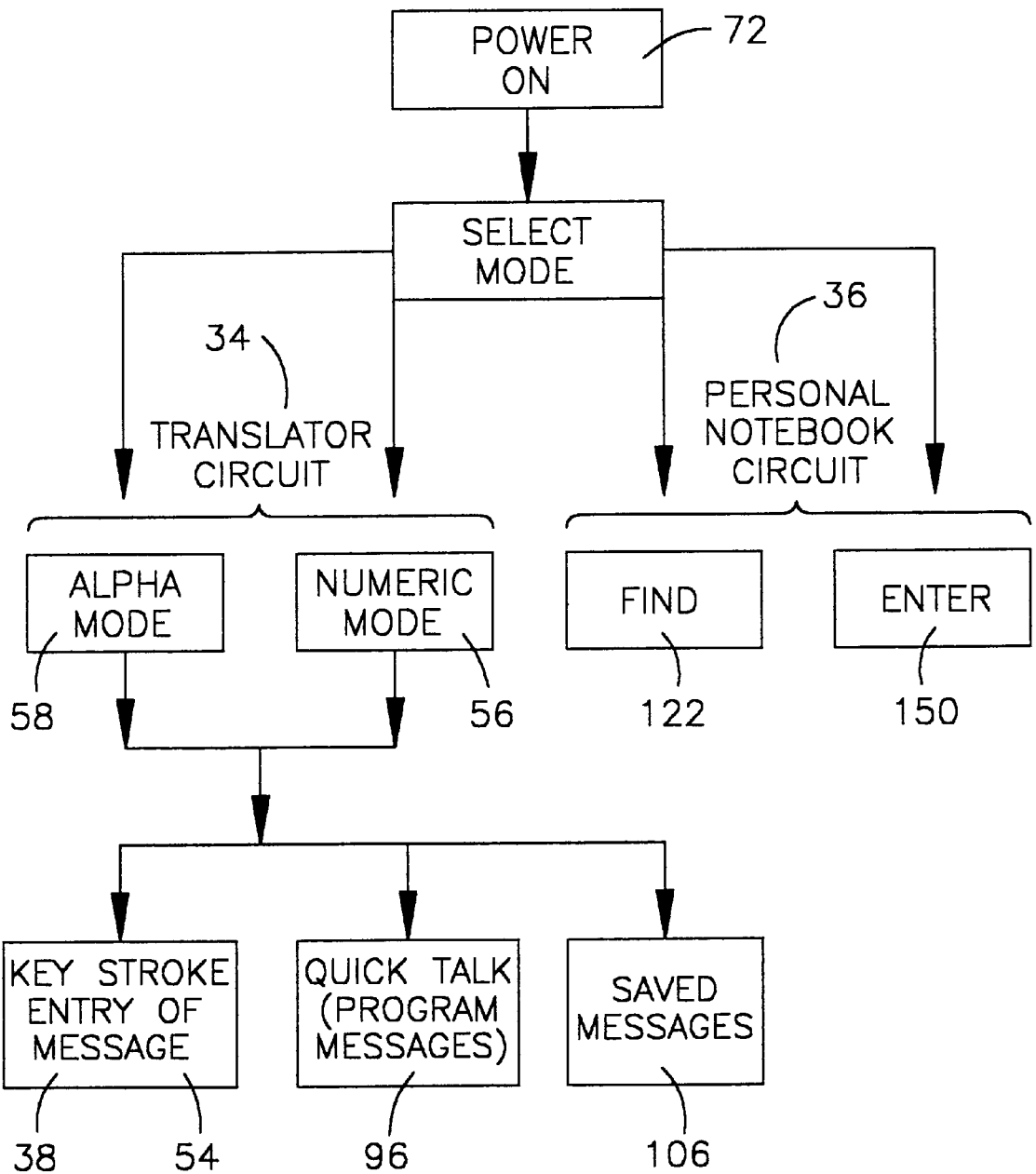
FIG. 16 is a flow chart that illustrates the basic options of steps that can be taken relative to the translator circuit and the personal notebook circuit in the basic operational mode of the translator device.

The flow chart of FIG. 16 illustrates taken in using translator device 26. After turning on power 72, a selection in made between four basic steps. If translator circuit 34 is selected, either numeric mode actuator 56 or alpha mode actuator 58 is activated. Next, one of the three following steps is taken: 1) a numereic message 28 or an alpha message 60 is entered onto display 32 by keystroke entry of numeric keys 54 or alpha letter keys; 2) programmed messages actuator (Quick Talk) is activated; or 3) saved message actuator (MSGS) is activated.

A slot counter 160 at the top left corner of translator display 32 shows the number of slots of the 20 slots in translator display 32 that have been filled, including numeric characters 30, alpha characters 62, numeric signals 92A(09), asterisk spaces (*), and blank slots 92 in the alpha mode. Slot counter 160 shows the number of slots used as follows: FIG. 3, 20 slots; FIG. 4, 14 slots; FIG. 7, 14 slots; FIG. 8, 17 slots. Slot counter 160 is associated with a RAM 162 that is coupled to translator display 32 in FIGS. 5 and 6.

A switch-display actuator 164 located at the top right side of translator display 32 is operable by a user to transfer from a first translator display 32 that has had all 20 slots used to a second new empty translator display 32. The new empty display allows a continuation of the message being entered to the new empty display. Further operation of switch-display actuator 164 returns translator display 32 to the first filled translator display 32. After activating numeric pager 22, the first 20 slots in the numeric mode can then be typed onto telephone keypad 12. Then switch-display actuator 164 can then be operated so that a new message, ultimately in the numeric mode, shows on translator display 32. Numeric pager 22 is again activated and the new numeric message on translator display 32 is typed onto telephone keypad 12 for final display on numeric pager 22. To encapsulate, when the transmission of the first message of 20 slots has been completed, the sender at telephone 10 must transmit two separate messages to numeric pager 22 shown in FIG. 1 by dialing numeric pager 22 a second time. Switch-display actuator 164 is coupled to switch 166 that is coupled to translator display 32 as shown in FIGS. 5 and 6.

A cursor 168 shown for purposes of exposition in FIG. 3 is positioned on translator display 32 in the fourth slot from the right between the numeric characters 9 and 0. Left and right horizontally aligned arrows 170A and 170B positioned on opposite sides of a delete actuator 172 are operable by a user to shift cursor in right and left directions. Specifically, operation of left arrow 170A which has the arrow head directed in a rightward direction results in moving cursor to the right one slot at a time, and operation of right arrow 170B which has the arrow head directed in a leftward direction results in moving cursor 168 in a leftward direction one slot at a time.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:

1. A translator device for use in relation to preparing a numeric message for sending from a telephone having a telephone keypad to a numeric pager and also in relation to displaying an alpha message originally received as a numeric message on a numeric pager, comprising input means including an electric circuit for generating signals in response to commands from a user which result in displaying a message in a plurality of slots on a display, said input means including a plurality of keys including individual alpha letter keys representative of each of the letters of the alphabet associated with corresponding alpha letter characters each capable of being displayed on said display responsive to keystroke operation of a selected alpha letter key, said plurality of keys also including distinctive numeral keys representative of selected disparate numerals in individual coextensive association with each of said individual alpha letter keys in accordance with an algorithm, said numeral keys being associated with corresponding numeric characters each capable of being displayed on said display responsive to keystroke operation of a selected numeral key, whereby numeric characters can be transferred as a numeric message for transmittal on the telephone keypad to the numeric pager by keystroke operation of the numeral keys of the telephone keypad in accordance with the numeric characters on said display, alpha means associated with said input means responsive to keystroke operation enabling an alpha mode of operation wherein said alpha characters are displayed on said display, numeric means associated with said input means responsive to keystroke operation enabling a numeric mode of operation wherein said numeric characters are displayed on said display, first translation means associated with said alpha means for enabling said alpha letter characters being displayed upon said display in said alpha mode of operation to be translated to numeric characters being displayed in accordance with said algorithm upon said display in said numeric mode of operation upon keystroke operation of said alpha means, and second translation means associated with said numeric means for enabling said numeric characters being displayed upon said display in said numeric mode of operation to be translated to alpha letter characters being displayed in accordance with said algorithm upon said display in said alpha mode of operation upon keystroke operation of said numeric means.

2. The device according to claim 1, wherein said algorithm is in accordance with the following conversion table:

| Numeral (key) | Alphabetic letter (key) |
|---|---|
| 1 | A |
| 2 | I |
| 3 | E |
| 4 | L |
| 5 | N |
| 6 | S |
| 7 | R |
| 8 | T |
| 9 | O |
| 22 | B |
| 33 | C |
| 44 | D |
| 55 | F |
| 66 | G |
| 77 | H |
| 88 | J |
| 99 | K |
| 01 | M |
| 02 | P |
| 03 | Q (or Qu) |
| 04 | U |
| 05 | V |
| 06 | W |
| 07 | Y |
| 001 | X |
| 002 | Z |

3. The device according to claim 2, further including programmable message means for placing at least one programmed message in one or the other of said numeric mode and said alpha mode into a programmed message memory module and for retrieving said at least one programmed message from said programmed message memory module for entry on said display in one or the other of said numeric mode and said alpha mode, said programmable message means including a programmable message key responsive to keystroke operation for placing said at least one programmed message on said display in one or the other of said numeric mode and said alpha mode.

4. The device according to claim 3, wherein said at least one programmed message is a plurality of programmed messages, and further including scroll means associated with said programmable message means and said input put means for entering each of said plurality of programmed messages on said display in one or the other of said numeric mode and said alpha mode.

5. The device of claim 4, wherein said programmable message means includes means for deleting any selected programmable message in said alpha mode and said numeric mode.

6. The device according to claim 1, wherein said numeric means includes a numeric actuator associated with said input means responsive to keystroke operation resulting in the activation of said numeric means, and wherein said alpha means includes an alpha actuator associated with said input means responsive to keystroke operation resulting in the activation of said alpha means.

7. The device according to claim 1, wherein said alpha means and said numeric means includes a single numeric and alpha actuator associated with said input means responsive to successive keystroke operation resulting in alternate activation of said numeric means and said alpha means.

8. The device according to claim 1, further including saved message means for placing at least one message on said display in one or the other of said numeric mode and said alpha mode into a saved message memory module and for retrieving said at least one saved message from said saved message memory module for entry on said display in one or the other of said numeric mode and said alpha mode, said saved message means including a saved message key responsive to keystroke operation for placing said at least one programmed message on said display in one or the other of said numeric mode and said alpha mode.

9. The device according to claim 8, wherein said at least one saved message is a plurality of saved messages, and further including scroll means associated with said saved message means and said input means for entering each of said plurality of saved messages on said display in one or the other of said numeric mode and said alpha mode.

10. The device of claim 9, wherein said saved message means includes means for deleting any selected saved message in said alpha mode and said numeric mode.

11. The device according to claim 1, wherein said input means includes a keyboard and a central processing unit coupled to said first and second translation means, and said alpha means includes an alpha module and said numeric means includes a numeric module, said display being coupled to said alpha module and to said numeric module, and wherein said first and second translation means includes an algorithm-translation memory module coupled to said central processing unit and to said numeric module and to said alpha module, said algorithm-translation memory module being activated in response to keystroke operation of one or the other of said alpha module and said numeric module.

12. The device according to claim 11, wherein said algorithm-translation memory module causes entry of an asterisk on said display in said numeric mode between successive numeric characters both upon keystroke operation of the same numeric key in sequence and also upon keystroke operation of two different numeric keys in sequence resulting in entry on said display of successive numeric characters.

13. The device according to claim 1, further including spacing means for display on said display of a space in said alpha mode and an asterisk in said numeric mode, said spacing means including a space key associated with said input means responsive to keystroke operation resulting in entry of said space in said alpha mode and in entry of said asterisk in said numeric mode.

14. The device according to claim 1, wherein said numeric keys are responsive to keystroke operation resulting is displaying on said display in said alpha mode at least one numeric character representing at least one number, and for displaying on said display in said numeric mode at least one numeric character associated with said at least one numeric character representing said at least one number in said alpha mode, and further including numeric signal means associated with said input means for entry of a blank space in a slot in said alpha mode immediately before and after entry on said display of said at least one numeric character representing a number in said alpha mode, and further for entry of a numeric signal in said numeric mode immediately before and after entry on said display of said at least one numeric character associated with said at least one numeric character representing a number in said alpha mode.

15. The device according to claim 14, wherein when said translator device is in said numeric mode, keystroke operation of said alpha means and of said first translation means results in each said numeric signal on said display being translated in said alpha mode on said display into said blank space.

16. The device according to claim 14, wherein when said translator device is in said alpha mode, keystroke operation of said numeric means and of said second translation means results in each said blank space on said display being translated in said numeric mode on said display into said numeric signal.

17. The device according to claim 14, wherein said at least one numeric character representing a number in said alpha mode is a plurality of numeric characters, and said at least one numeric character associated with said numeric character associated with said at least one number in said numeric mode is a plurality of numeric characters.

18. The device according to claim 17, further including clearing means for removing all numeric characters and numeric signals from said display in said numeric mode and for removal of all alpha characters and numeric characters representing numbers including said blanks before and after said numeric characters representing numbers from said display in said alpha mode, said clearing means including a clear actuator associated with said input means responsive to keystroke operation resulting in activation of said clearing means.

19. The device according to claim 1, further including delete means for clearing said display in any one of said plurality of slots including clearing one or the other of a selected single numeric character and a single alpha character from one of said plurality of slots on said display in one or the other of said numeric mode and said alpha mode, respectively, said delete means including a delete actuator responsive to keystroke operation resulting in activation of said delete means.

20. The device according to claim 19, further including cursor means for selecting a position on said display relative to said plurality of slots by way of a cursor movable in left and right directions one slot at a time in response to keystroke operation of left and right arrow keys associated with said input means prior to keystroke operation of said delete actuator.

21. The device according to claim 1, further including canned message means for entering at least one preprogrammed message on said display in one or the other of said alpha mode and said numeric mode, said canned message means including at least one canned message key associated with said input means responsive to keystroke operation resulting in entry on said display of canned alpha characters in said alpha mode comprising said at least one alpha canned message and resulting in entry of canned numeric characters in said numeric mode comprising said at least one numeric canned message.

22. The device according to claim 21, wherein said at least one preprogrammed message is a plurality of preprogrammed messages and said at least one canned message key is a plurality of canned message keys.

23. The device according to claim 1, wherein said display holds at least 20 slots for entry of one or the other of a maximum of one or the other of 20 numeric characters or 20 alpha characters.

24. The device according to claim 23, wherein said at least 20 slots is a plurality of slots.

25. The device according to claim 24, further including counting means for recording and showing the number of said plurality of slots that have been used on said display.

26. The device according to claim 1, further including switch display means for automatically clearing the display of one or the other of numeric characters and alpha characters when all the slots are filled and for presenting a clear display for allowing further entry of one of the other of numeric and alpha characters.

27. The device according to claim 26, wherein said input means further includes another electrical circuit connected to programmable personal message means for entry upon said display of at least one category of personal message of one or the other of at least one personal alphabetic message and at least one personal numeral message associated with said alphabetic message in one or the other of an alphabetic mode and a numeral mode, respectively, comprising said alpha characters and said numeric characters, respectively, upon keystroke operation of one or the other of said alpha keys and said numeric keys, respectively, said another electrical circuit being connected to said switch display means, activation of said at least one category activating said switch clear means to activate said another electrical circuit.

28. The device of claim 27, further including alpha letter means associated with said input means and said another electrical circuit responsive to keystroke operation enabling an alphabetic mode of operation wherein said alpha characters are displayed on said display, and further including numeral means associated with said input means and said another electrical circuit responsive to keystroke operation enabling a numeral mode of operation wherein said numeric characters are displayed on said display.

29. The device according to claim 28, wherein said at least one personal alpha letter message and said at least one associated personal numeral message is a plurality of personal alpha letter messages and a plurality of associated personal numeral messages stored in an alphabetic memory module and in a numeral memory module, respectively.

30. The device according to claim 29, wherein said at least one category of personal message is a plurality of categories of personal messages each including a plurality of personal alpha letter messages and a plurality of associated numeral messages.

31. The device according to claim 30, further including menu means for accessing each of said plurality of categories of personal messages, said menu means including a menu actuator associated with said input means and said another circuit means, said menu actuator being activated in response to keystroke operation.

32. The device according to claim 31, wherein each of said plurality of categories includes a plurality of subcategory messages each containing a plurality of subcategory messages in said alphabetic mode and in said numeral mode and further including scroll means associated with each of said plurality of categories for locating each of said plurality of subcategory messages for presentation on said display.

33. The device according to claim 32, further including programming means for selecting any of said plurality of categories and selecting any of said plurality of subcategory messages and for one or the other of removing and entering any personal message therein.

34. A method of preparing a numeric message for dispatch from a telephone having a telephone keypad to a numeric pager wherein the sender of the numeric message has a sender translator device and the receiver of the numeric message has the numeric pager and a receiver translator device, comprising the steps of:

the sender selecting an alpha mode of operation on the sender translator display by keystroke operation of an alpha mode actuator, the sender entering a selected alpha message by keystroke operation of selected alpha letter keys of a plurality of individual alpha letter keys representative of each of the letters of the alphabet associated with corresponding alpha characters on said sender translator, each keystroke operation resulting in the display on said sender translator display of selected alpha characters comprising the alpha message, the sender selecting a numeric mode of operation on said translator display by keystroke operation of a numeric mode actuator wherein said alpha character message on said translator display is translated into an encoded numeric message on said translator display according to an algorithm, the sender dialing on a standard DTMF telephone keypad the pager numbers of the numeric pager of the receiver of said numeric message, wherein the dialed pager is activated, the sender transmitting the encoded numeric message that is displayed on said translator display onto a standard DTMF telephone keypad by entering by keystroke operation of the numeric keys of the telephone keypad in accordance with the encoded numeric message on said translator display thereby accessing the paging terminal by way of the public telephone network, and thereupon accessing the pager of the receiver of the message via the automated paging terminal, wherein the encoded numeric message is displayed upon the pager screen, the receiver selecting the numeric mode of operation on the receiver translator device by keystroke operation of the numeric mode actuator, the receiver entering the encoded numeric message shown on the pager screen by keystroke operation of a plurality of numeric keys associated in individual coextensive association with each of said alpha letter keys in accordance with said algorithm, each keystroke operation resulting in the display on said receiver translator display of particular numeric characters comprising the numeric message, the receiver selecting the alpha mode of operation by keystroke operation of the alpha mode actuator wherein the numeric message on the translator display is translated in accordance with the algorithm into the alpha message first entered on the sender translator display.

35. The method according to claim 34, wherein said algorithm is defined by the following table:

| Numeral (key) | Alphabetic letter (key) |
|---|---|
| 1 | A |
| 2 | I |
| 3 | E |
| 4 | L |
| 5 | N |
| 6 | S |
| 7 | R |
| 8 | T |
| 9 | O |
| 22 | B |
| 33 | C |
| 44 | D |
| 55 | F |
| 66 | G |
| 77 | H |
| 88 | J |
| 99 | K |
| 01 | M |
| 02 | P |
| 03 | Qu |
| 04 | U |
| 05 | V |
| 06 | W |
| 07 | Y |

-continued

| Numeral (key) | Alphabetic letter (key) |
|---|---|
| 001 | X |
| 002 | Z |

36. The method according to claim 34, further including the steps of:
   entering by keystroke operation a numeric signal key on said translator display in the alpha mode of operation in association with further entry of numeral keys signaling that numeric characters associated with said numeric signal key represent numbers, entry of said numeric signal key resulting in blanks in the slots associated with the numeric characters on said display representing numbers,
   activating said numeric mode actuator resulting in translating said alpha message on said translator display to a numeric message on said translator display in said numeric mode of operation wherein the blanks in the slots associated with the numeric characters appears as a numeric symbol comprising selected numeric characters in said numeric mode, and
   transmitting the numeric number message displayed on said translator display onto the telephone keypad, wherein the numeric signal and associated numeric characters representing numbers in the alpha mode are displayed upon the pager screen, and
   the receiver of the message activating the numeric mode actuator and entering by keystroke operation of the numeral keys the numeric signals and associated numeric characters on the pager screen onto the receiver translator display thus translating the numeric signal with the numeric character message on the pager screen into numerals in the numeric message, and
   activating the alpha mode actuator thus translating the numeric message on the translator display including the numeric signals and the numeric character message representing numerals in the alpha mode into an alpha mode message including numerals representing numbers and blank slots associated with the numeric signals in the numeric mode message.

37. The method according to claim 34, further including the steps of:
   selecting and activating one of an alpha letter mode of operation and a numeral mode of operation,
   selecting and entering a default switch wherein both a translator electric circuit and a personal notebook electric circuit are activated for subsequent selection,
   selecting the personal notebook electric circuit by activating a find menu actuator on the keyboard so as to activate for subsequent selection at least one category of personal messages holding a plurality of locations containing at least one subcategory of personal message,
   scrolling through locations to the at least one subcategory of personal message for viewing onto the translator display,
   optionally selecting and activating the other of the alpha mode of operation and the numeric mode of operation display for viewing on the translator display, and
   selecting and entering the default switch.

38. The method according to claim 37, wherein said at least one category of personal messages is a plurality of categories of personal messages and said at least one subcategory of personal message is a plurality of subcategories of personal messages.

39. The method according to claim 37, further including the step of deleting the selected message by activation of a delete actuator.

40. The method according to claim 34, further including the steps of:
   selecting and activating one of an alpha letter mode of operation and a numeral mode of operation,
   selecting and entering a default switch on the keyboard wherein one of a translator electric circuit and a personal notebook electric circuit is activated,
   selecting the personal notebook electric circuit by activating an enter menu actuator on the keyboard so as to activate for subsequent selection at least one category of personal messages holding a plurality of locations capable of holding at least one subcategory of personal message,
   entering a personal message by keystroke operation of one of the alpha letter keys and the numeric keys according to the selected alpha mode or numeric mode of operation, respectively,
   saving the personal message by keystroke operation of a save actuator on the keyboard,
   entering the other of the selected alpha mode and numeric mode of operation,
   entering another personal message by keystroke operation of the other of the alpha letter keys and the numeric keys,
   saving the another personal message by keystroke operation of the save actuator, and
   selecting and entering the default switch.

41. The method according to claim 40, wherein the at least one category of personal messages having a plurality of locations capable of holding at least one subcategory of personal message is a plurality of categories of personal messages having a plurality of locations capable of holding a plurality of subcategories of personal messages.

42. The method according to claim 34, further including the steps of:
   selecting and activating one of an alpha letter mode of operation and a numeral mode of operation,
   selecting and entering a default switch on the keyboard wherein one of a translator electric circuit and a personal notebook electric circuit is activated,
   selecting the personal notebook electric circuit by activating an enter menu actuator on the keyboard so as to activate for subsequent selection personal code means including at least one personal code key having a distinctive printed numeral,
   selecting and activating the alpha letter mode of operation,
   entering by keystroke operation of the alpha keys an alpha message onto the display,
   saving the alpha message by keystroke entry of the save actuator, and
   selecting and entering the default switch.

43. The method according to claim 42, wherein said at least one personal code key having a distinctive printed numeral is a plurality of personal code keys each having a distinctive printed numeral.

44. The method according to claim 42, further including the step of:

entering by keystroke of numeral keys related to the printed numeral of the at least one personal code key by entering by keystroke operation of the numeric keys of the telephone keypad so as to access the pager screen where a numeric message related to the printed numeral of the at least one personal code key is displayed.

* * * * *